US012672155B2

(12) United States Patent
Li et al.

(10) Patent No.:    US 12,672,155 B2
(45) Date of Patent:        Jun. 30, 2026

(54) CARRIER AGGREGATION ON SIDELINK

(71) Applicant: QUALCOMM Incorporated, San Diego, CA (US)

(72) Inventors: Qing Li, Princeton Junction, NJ (US); Hong Cheng, Basking Ridge, NJ (US); Peng Cheng, Beijing (CN); Gavin Bernard Horn, La Jolla, CA (US); Gabi Sarkis, San Diego, CA (US); Tien Viet Nguyen, Bridgewater, NJ (US)

(73) Assignee: Qualcomm Incorporated, San Diego, CA (US)

( * ) Notice: Subject to any disclaimer, the term of this patent is extended or adjusted under 35 U.S.C. 154(b) by 451 days.

(21) Appl. No.: 18/265,424

(22) PCT Filed: Mar. 1, 2021

(86) PCT No.: PCT/CN2021/078422
§ 371 (c)(1),
(2) Date: Jun. 5, 2023

(87) PCT Pub. No.: WO2022/183312
PCT Pub. Date: Sep. 9, 2022

(65) Prior Publication Data
US 2024/0032077 A1     Jan. 25, 2024

(51) Int. Cl.
*H04W 72/40*          (2023.01)
*H04W 72/0453*      (2023.01)
*H04W 88/06*          (2009.01)

(52) U.S. Cl.
CPC ....... *H04W 72/40* (2023.01); *H04W 72/0453* (2013.01); *H04W 88/06* (2013.01)

(58) Field of Classification Search
CPC ..... H04L 5/0085; H04L 5/001; H04L 5/0098; H04L 5/0033; H04L 5/0023; H04L 5/006; H04W 72/0453; H04W 72/40; H04W 72/20; H04W 88/06; H04W 92/18
See application file for complete search history.

(56) References Cited

U.S. PATENT DOCUMENTS 11,818,672 B2 * 11/2023 Khoryaev ........... H04W 56/001
2019/0306911 A1 10/2019 Hahn
(Continued)

FOREIGN PATENT DOCUMENTS

WO     2019022504 A1     1/2019
WO     2019036863 A1     2/2019
(Continued)

OTHER PUBLICATIONS

Supplementary European Search Report—EP21928403—Search Authority—The Hague—Oct. 9, 2024.
(Continued)

*Primary Examiner* — Brian D Nguyen
(74) *Attorney, Agent, or Firm* — Procopio, Cory, Hargreaves & Savitch LLP

(57) ABSTRACT

The present disclosure relates to methods and devices for wireless communication of an apparatus, e.g., a wireless device and/or a UE. In one aspect, the apparatus may receive a configuration for inter-RAT or intra-RAT sidelink carrier aggregation including one or more inter-RAT or intra-RAT CA parameters. The apparatus may also determine one or more inter-RAT or intra-RAT carriers for SL CA based on the configuration for inter-RAT or intra-RAT SL CA. The apparatus may also transmit, to at least one second wireless device, an indication of the one or more inter-RAT or intra-RAT carriers for SL CA.

30 Claims, 17 Drawing Sheets

(56) References Cited

U.S. PATENT DOCUMENTS

| | | | |
|---|---|---|---|
| 2020/0169986 A1 | 5/2020 | Lee et al. | |
| 2021/0105775 A1* | 4/2021 | Tseng | H04W 56/0005 |
| 2021/0136646 A1* | 5/2021 | Tseng | H04W 36/0088 |
| 2021/0203453 A1* | 7/2021 | Kim | H04L 5/0055 |
| 2021/0329598 A1* | 10/2021 | Wang | H04W 4/40 |
| 2022/0104179 A1* | 3/2022 | Masini | H04W 4/40 |
| 2022/0286881 A1* | 9/2022 | Orsino | H04W 76/15 |
| 2023/0102142 A1* | 3/2023 | Kim | H04W 72/1263 |
| | | | 370/329 |

FOREIGN PATENT DOCUMENTS

| | | | |
|---|---|---|---|
| WO | 2019074348 A1 | 4/2019 | |
| WO | 2019193100 A1 | 10/2019 | |

OTHER PUBLICATIONS

International Search Report and Written Opinion—PCT/CN2021/078422—ISAEPO—Jul. 26, 2021.

3GPP: "3rd Generation Partnership Project, Technical Specification Group Radio Access Network, Overall description of Radio Access Network (RAN) aspects for Vehicle-to-everything (V2X) based on LTE and NR(Release 16)", TR 37.985 V1.1.0, Feb. 2020, pp. 1-33.

OPPO: "Summary of Sidelink Capability Related Contributions", R2-2004403, 3GPP TSG-RAN WG2 #110-e E-meeting, Jun. 2020, pp. 1-3.

* cited by examiner

1500

1502 — Receive a configuration for inter-RAT or intra-RAT SL CA

1504 — Receive an indication of one or more inter-RAT or intra-RAT carriers

1506 — Monitor the one or more inter-RAT or intra-RAT carriers

1508 — Transmit a confirmation of the indication of the carriers

1510 — Communicate with a second wireless device via one or more SLs based on the carriers

CARRIER AGGREGATION ON SIDELINK

CROSS REFERENCE TO RELATED APPLICATION(S)

This application is a National Stage Application filed under 35 U.S.C. § 371 of PCT International Application No. PCT/CN2021/078422, entitled "METHODS AND APPA-RATUS FOR CARRIER AGGREGATION ON SIDE-LINK" and filed Mar. 1, 2021, which is expressly incorporated by reference herein in its entirety.

BACKGROUND

Technical Field

The present disclosure relates generally to communication systems, and more particularly, to sidelink carrier aggregation in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first wireless device or a user equipment (UE). The apparatus may transmit, to a base station, at least one of an indication of a capability of a first wireless device or a suitable configuration for inter-radio access technology (inter-RAT) or intra-RAT sidelink (SL) carrier aggregation (CA). The apparatus may also receive a configuration for inter-radio access technology (inter-RAT) or intra-RAT sidelink (SL) carrier aggregation (CA) including one or more inter-RAT or intra-RAT CA parameters. The apparatus may also transmit, to at least one second wireless device, a configuration for inter-RAT or intra-RAT SL CA. Additionally, the apparatus may determine one or more inter-RAT or intra-RAT carriers for SL CA based on the configuration for inter-RAT or intra-RAT SL CA. The apparatus may also measure at least one of a channel busy ratio (CBR), a reference signal received power (RSRP), or a received signal strength indicator (RSSI) of each of the plurality of candidate inter-RAT or intra-RAT carriers. Moreover, the apparatus may select the one or more inter-RAT or intra-RAT carriers from a plurality of candidate inter-RAT or intra-RAT carriers based on the configuration for inter-RAT or intra-RAT SL CA. The apparatus may also transmit, to at least one second wireless device, an indication of the one or more inter-RAT or intra-RAT carriers for SL CA. The apparatus may also receive, from the at least one second wireless device, a confirmation of the indication of the one or more inter-RAT or intra-RAT carriers. Further, the apparatus may communicate with the at least one second wireless device via one or more sidelinks (SLs) based on the one or more inter-RAT or intra-RAT carriers for SL CA. The apparatus may also measure at least one of a channel busy ratio (CBR), a reference signal received power (RSRP), or a received signal strength indicator (RSSI) of the plurality of candidate inter-RAT or intra-RAT carriers, where the one or more inter-RAT or intra-RAT carriers are re-selected or dropped based on the measurement and the one or more other inter-RAT or intra-RAT carriers are selected based on the measurement. The apparatus may also re-select or drop the one or more inter-RAT or intra-RAT carriers from the plurality of candidate inter-RAT or intra-RAT carriers; or select one or more other inter-RAT or intra-RAT carriers from the plurality of candidate inter-RAT or intra-RAT carriers, where the one or more other inter-RAT or intra-RAT carriers are selected if the one or more inter-RAT or intra-RAT carriers are dropped.

In another aspect of the disclosure, a method, a computer-readable medium, and an apparatus are provided. The apparatus may be a first wireless device or a user equipment (UE). The apparatus may receive a configuration for inter-radio access technology (inter-RAT) or intra-RAT sidelink (SL) carrier aggregation (CA) including one or more inter-RAT or intra-RAT CA parameters. The apparatus may also receive, from a second wireless device, an indication of one or more inter-RAT or intra-RAT carriers for SL CA. The apparatus may also monitor, based on the received indication, the one or more inter-RAT or intra-RAT carriers for SL CA. Additionally, the apparatus may transmit, to the second wireless device, a confirmation of the indication of the one or more inter-RAT or intra-RAT carriers, where the confirmation of the indication of the one or more inter-RAT or intra-RAT carriers is transmitted via radio resource control (RRC) signaling or an acknowledgement (ACK) to a medium access control (MAC) control element (MAC-CE). The apparatus may also communicate with the second wireless device via one or more sidelinks (SLs) based on the one or more inter-RAT or intra-RAT carriers for SL CA.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
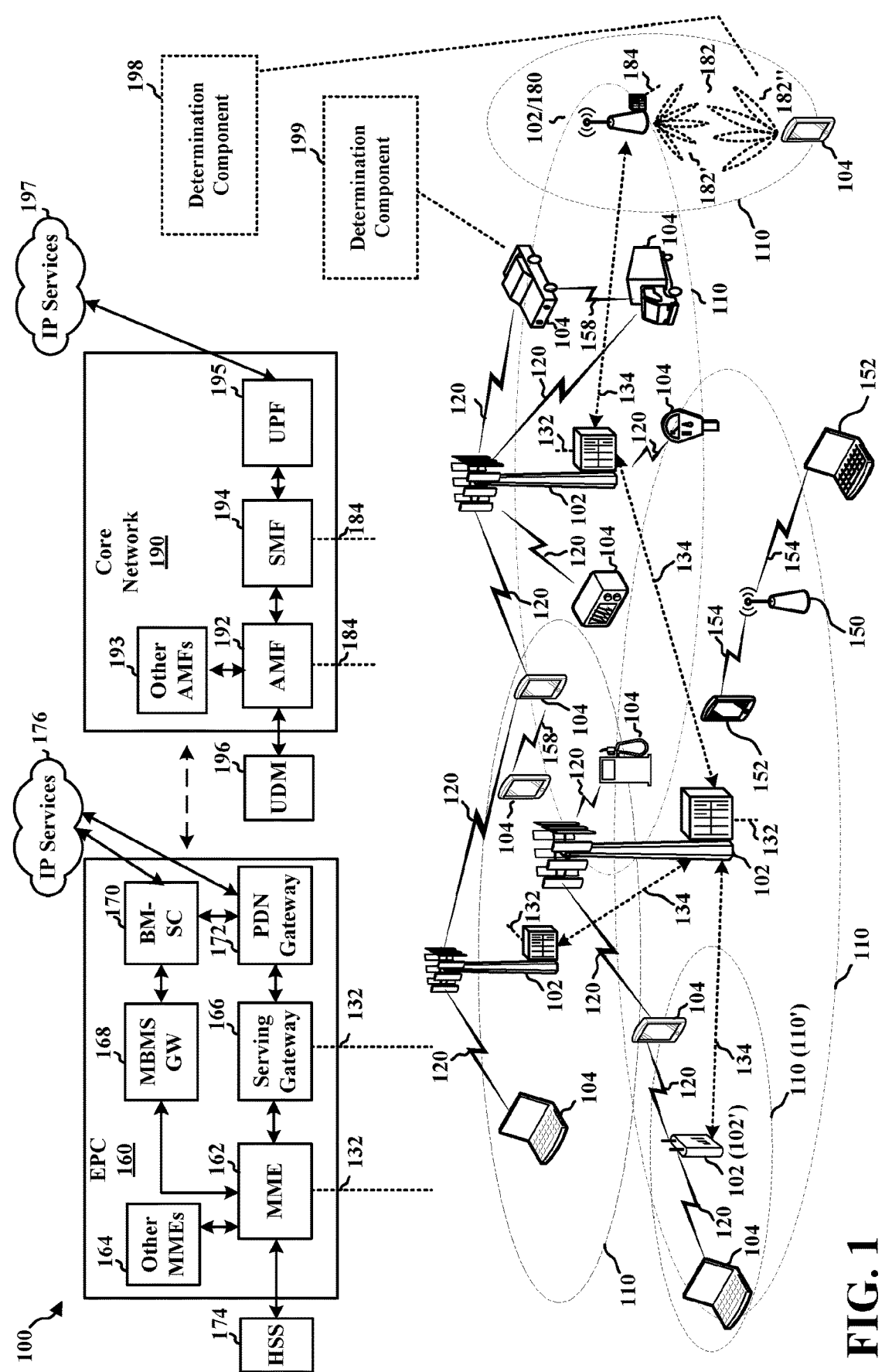
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a determination component 198 configured to transmit, to a base station, at least one of an indication of a capability of a first wireless device or a suitable configuration for inter-radio access technology (inter-RAT) or intra-RAT sidelink (SL) carrier aggregation (CA). Determination component 198 may also be configured to receive a configuration for inter-radio access technology (inter-RAT) or intra-RAT sidelink (SL) carrier aggregation (CA) including one or more inter-RAT or intra-RAT CA parameters. Determination component 198 may also be configured to transmit, to at least one second wireless device, a configuration for inter-RAT or intra-RAT SL CA. Determination component 198 may also be configured to determine one or more inter-RAT or intra-RAT carriers for SL CA based on the configuration for inter-RAT or intra-RAT SL CA. Determination component 198 may also be configured to measure at least one of a channel busy ratio (CBR), a reference signal received power (RSRP), or a received signal strength indicator (RSSI) of each of the plurality of candidate inter-RAT or intra-RAT carriers. Determination component 198 may also be configured to select the one or more inter-RAT or intra-RAT carriers from a plurality of candidate inter-RAT or intra-RAT carriers based on the configuration for inter-RAT or intra-RAT SL CA. Determination component 198 may also be configured to transmit, to at least one second wireless device, an indication of the one or more inter-RAT or intra-RAT carriers for SL CA. Determination component 198 may also be configured to receive, from the at least one second wireless device, a confirmation of the indication of the one or more inter-RAT or intra-RAT carriers. Determination component 198 may also be configured to communicate with the at least one second wireless device via one or more sidelinks (SLs) based on the one or more inter-RAT or intra-RAT carriers for SL CA. Determination component 198 may also be configured to measure at least one of a channel busy ratio (CBR), a reference signal received power (RSRP), or a received signal strength indicator (RSSI) of the plurality of candidate inter-RAT or intra-RAT carriers, where the one or more inter-RAT or intra-RAT carriers are re-selected or dropped based on the measurement and the one or more other inter-RAT or intra-RAT carriers are selected based on the measurement. Determination component 198 may also be configured to re-select or drop the one or more inter-RAT or intra-RAT carriers from the plurality of candidate inter-RAT or intra-RAT carriers; or select one or more other inter-RAT or intra-RAT carriers from the plurality of candidate inter-RAT or intra-RAT carriers, where the one or more other inter-RAT or intra-RAT carriers are selected if the one or more inter-RAT or intra-RAT carriers are dropped.

Referring again to FIG. 1, in certain aspects, the UE 104 may include a determination component 199 configured to receive a configuration for inter-radio access technology (inter-RAT) or intra-RAT sidelink (SL) carrier aggregation (CA) including one or more inter-RAT or intra-RAT CA parameters. Determination component 199 may also be configured to receive, from a second wireless device, an indication of one or more inter-RAT or intra-RAT carriers for SL CA.

Determination component 199 may also be configured to monitor, based on the received indication, the one or more inter-RAT or intra-RAT carriers for SL CA. Determination component 199 may also be configured to transmit, to the second wireless device, a confirmation of the indication of the one or more inter-RAT or intra-RAT carriers, where the confirmation of the indication of the one or more inter-RAT or intra-RAT carriers is transmitted via radio resource control (RRC) signaling or an acknowledgement (ACK) to a medium access control (MAC) control element (MAC-CE). Determination component 199 may also be configured to communicate with the second wireless device via one or more sidelinks (SLs) based on the one or more inter-RAT or intra-RAT carriers for SL CA.

Although the following description may be focused on 5G NR, the concepts described herein may be applicable to other similar areas, such as LTE, LTE-A, CDMA, GSM, and other wireless technologies.

Figures 2A, 2B, 2C, 2D:
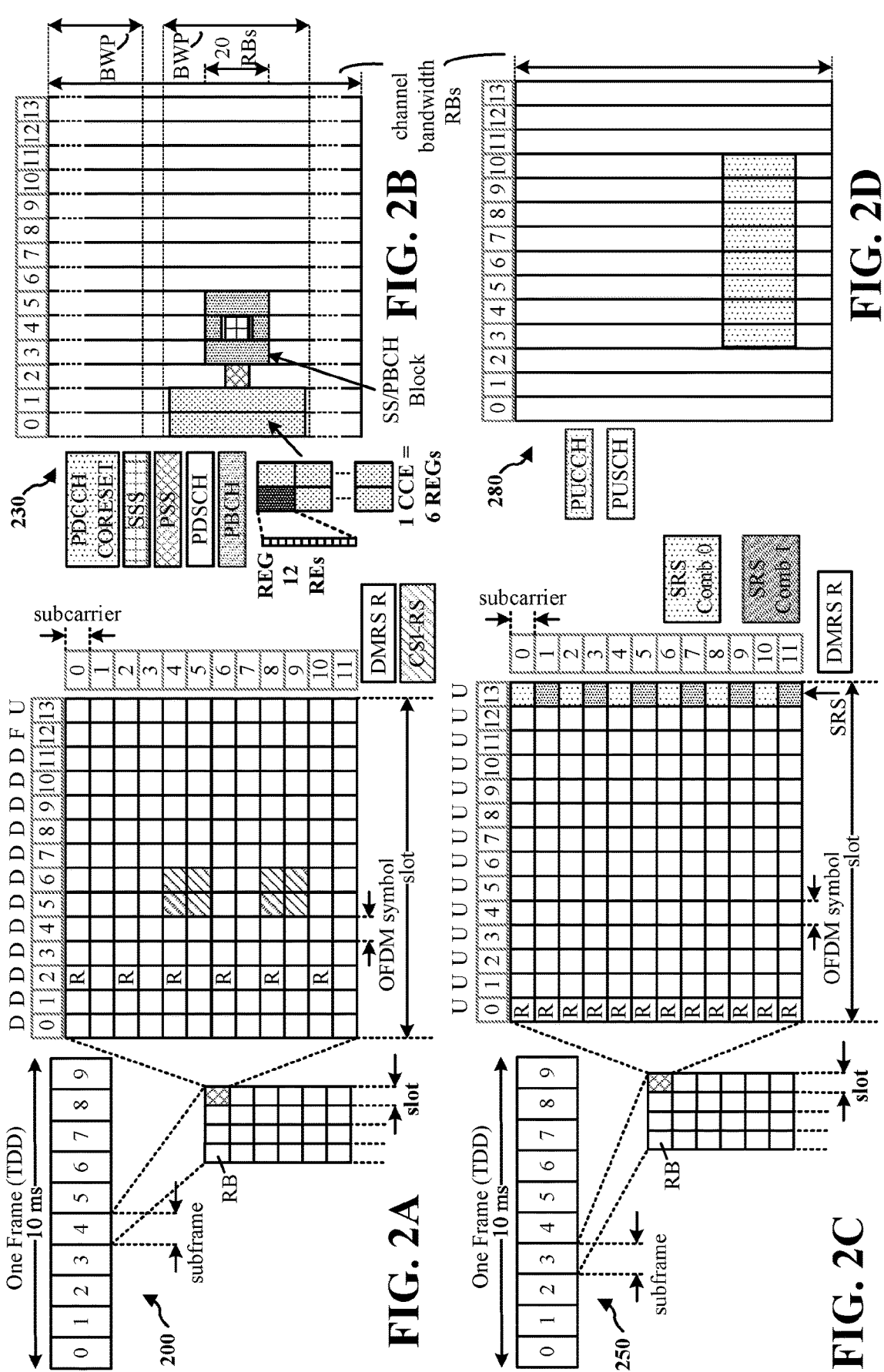
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
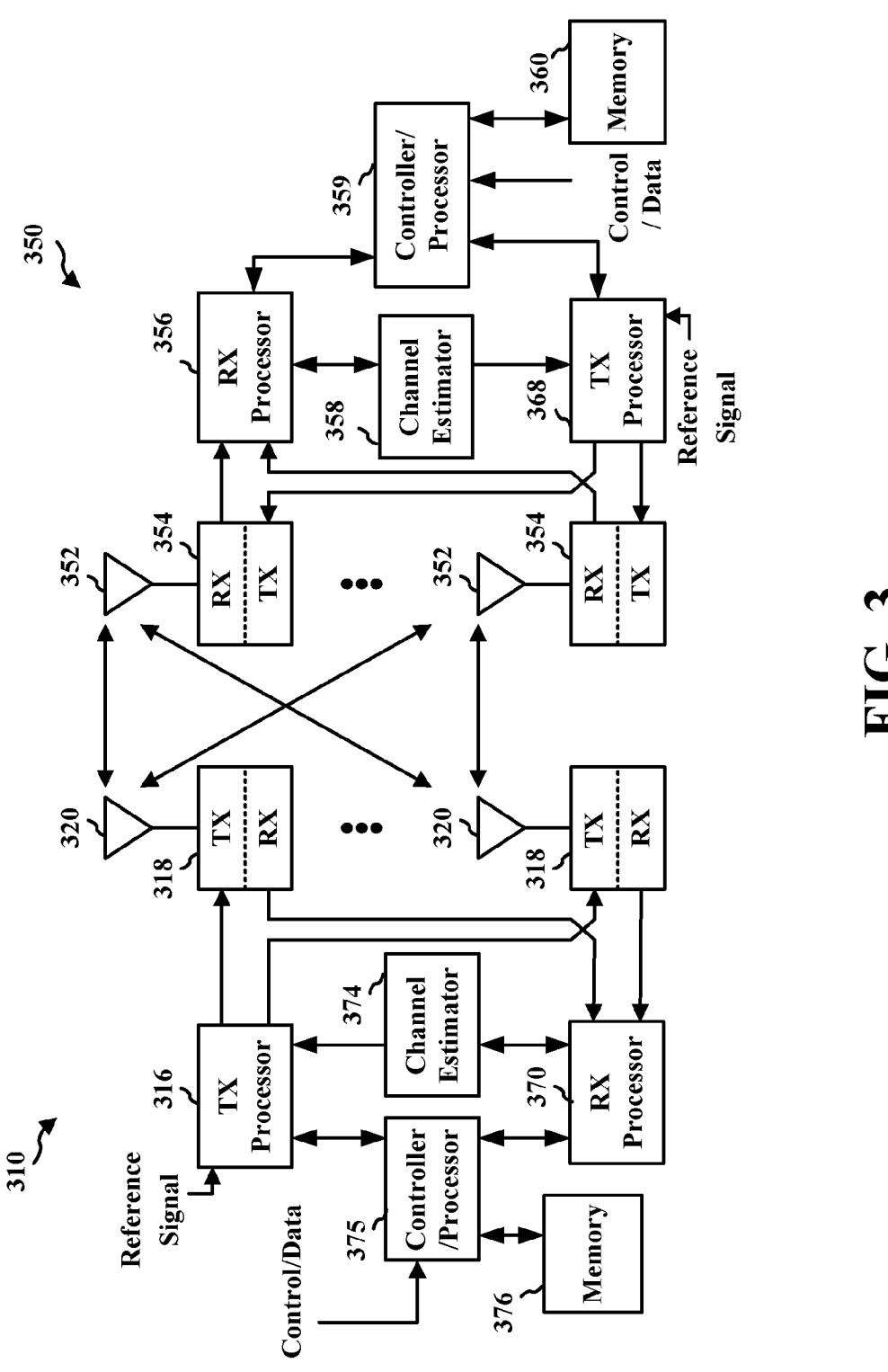
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 368, the RX processor 356, and the controller/processor 359 may be configured to perform aspects in connection with 199 of FIG. 1.

Some aspects of wireless communications can utilize carrier aggregation (CA), which is a technique of assigning multiple component carriers (CCs) or frequency blocks to a wireless device or user. For instance, carrier aggregation can be used to increase the maximum data rate per-device or per-user during wireless communication. As the amount of CCs or frequency blocks increases for each device or user, the maximum data rate may likewise increase. Carrier aggregation can be utilized with a number of different types of wireless communications, e.g., vehicle-to-everything (V2X), sidelink, etc.

Figure 4:
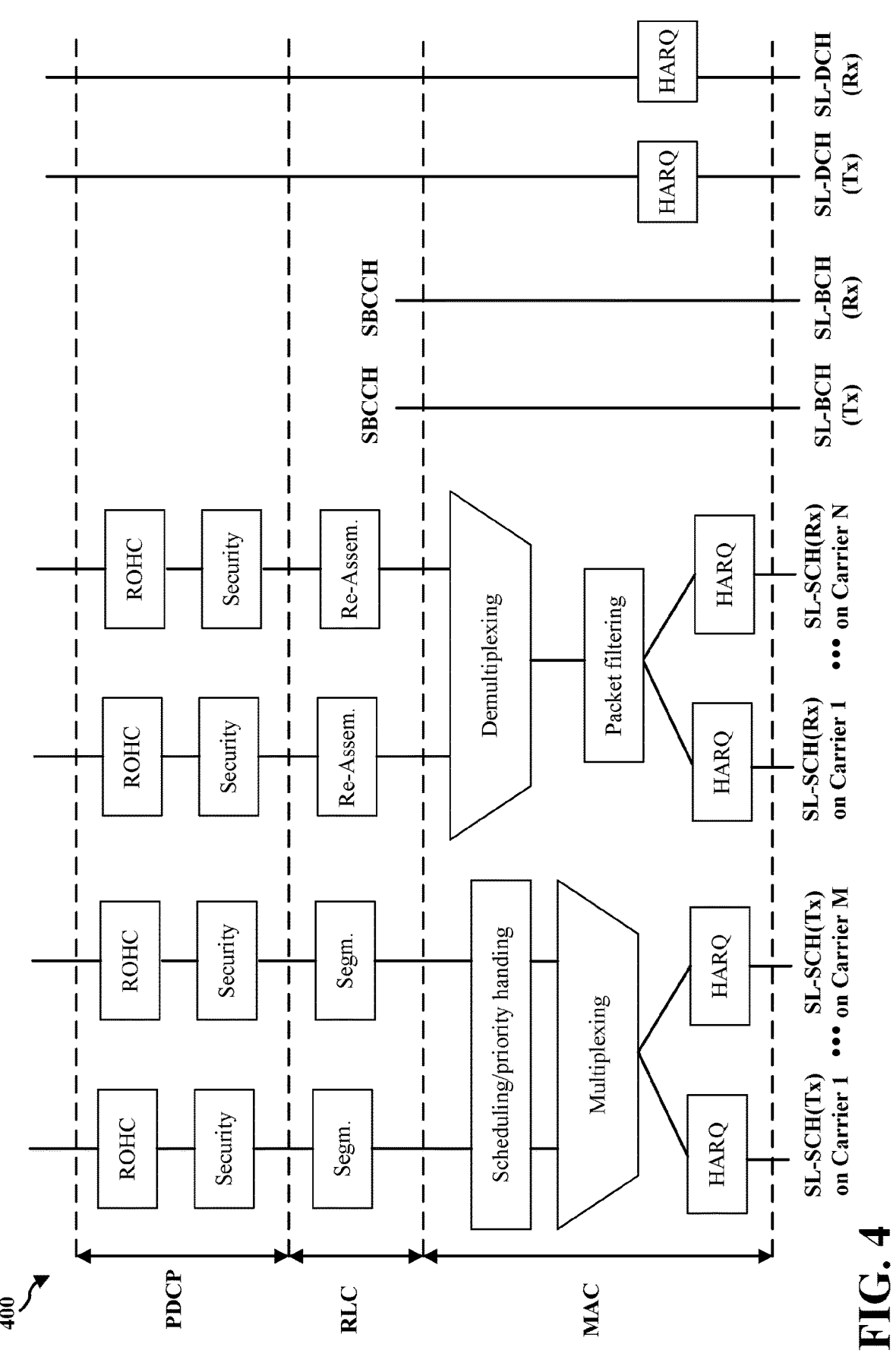
FIG. 4 is a diagram illustrating an example of carrier aggregation.

FIG. 4 is a diagram 400 illustrating an example of carrier aggregation. More specifically, FIG. 4 depicts carrier aggregation implemented with V2X communication, e.g., LTE V2X sidelink communication. As shown in FIG. 4, one independent HARQ entity per-carrier may be utilized for V2X sidelink communication and each transport block and its potential HARQ retransmissions may be mapped to a single carrier. Further, multiple transport blocks may be transmitted in parallel on different carriers for a throughput gain.

In some aspects, sidelink CA in certain resource allocations, e.g., resource allocation mode 3 using a dynamic grant, may be similar to sidelink CA on a Uu interface, such as by including a carrier indication field (CIF) in the DCI from the base station. Additionally, sidelink CA in other resource allocations, e.g., sidelink CA in resource allocation mode 4, may utilize a sensing procedure to select resources independently on each involved carrier. Further, the same carrier may be used for all transport blocks of the same sidelink process, at least until the process triggers a resource re-selection. However, carrier aggregation may not be supported in some types of wireless communications, e.g., 5G NR V2X communications.

Some types of advanced V2X applications or services may also specify for wider band operations to meet lower latency and higher data rate specifications. However, a limited amount of spectrum has been assigned to NR V2X operations. Also, LTE V2X and NR V2X may coexist for a number of years, as a replacement cycle for vehicles is longer than a handset or UE. Accordingly, it may be beneficial for V2X applications or services to determine how to improve spectrum utilization for both LTE V2X and NR V2X.

Figure 5:
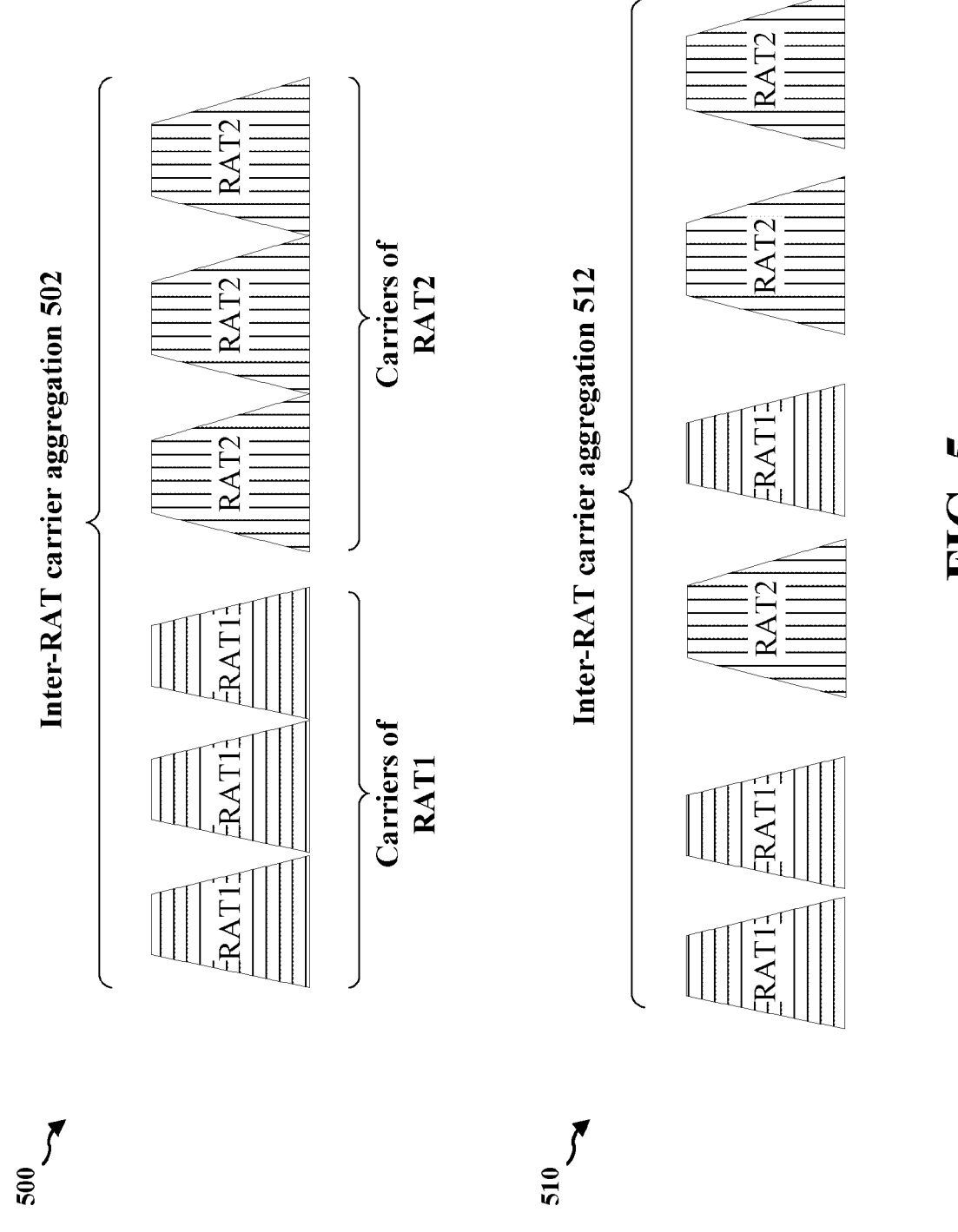
FIG. 5 includes diagrams illustrating examples of inter-RAT carrier aggregation.

FIG. 5 includes diagrams 500 and 510 illustrating examples of carrier aggregation. More specifically, FIG. 5 displays examples of inter-radio access technology (inter-RAT) carrier aggregation 502 in diagram 500 and inter-RAT carrier aggregation 512 in diagram 510. As shown in FIG. 5, when multiple radio access technologies (RATs), e.g., NR V2X and LTE V2X or NR V2X and WiFi, etc., coexist within a device, inter-RAT carrier aggregation on sidelink communication may be utilized to support advanced V2X services. Many types of applications or services may utilize high data rate and low latency on sidelink communications, e.g., commercial applications and digital public safety services. Therefore, intra-RAT carrier aggregation on sidelink is important to improve the operation bandwidth for supporting higher data rate and lower latency specifications.

Figure 6:
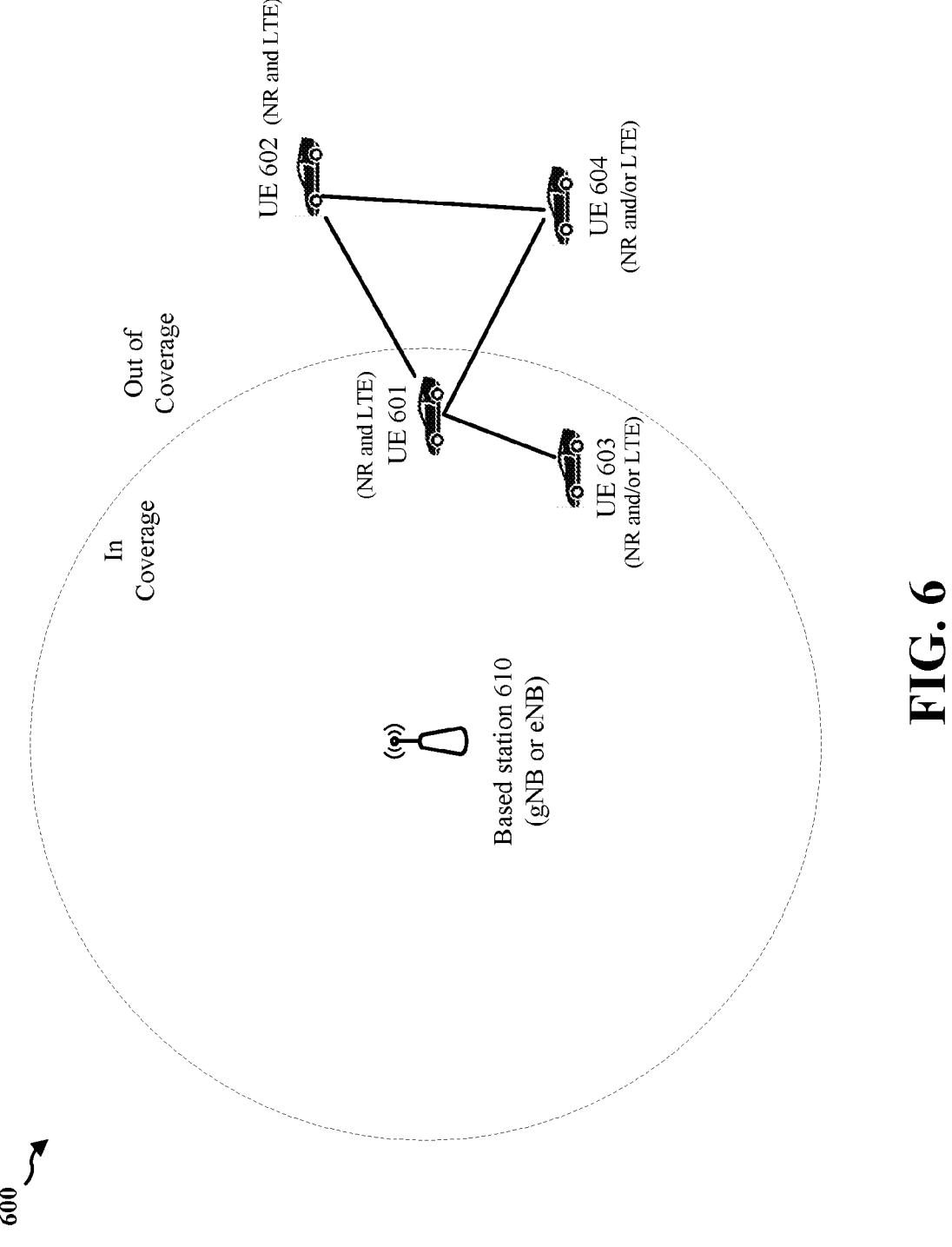
FIG. 6 is a diagram illustrating example communication between devices with different RAT capabilities.

FIG. 6 is a diagram 600 illustrating example communication between devices with different RAT capabilities. As shown in FIG. 6, diagram 600 includes UE 601, UE 602, UE 603, UE 604, and base station 610 (e.g., a gNB or eNB). As depicted in diagram 600, UE 601 and UE 603 are within the coverage of base station 610, while UE 602 and UE 604 are outside of the coverage of base station 610. UEs 601-604 may also communicate via sidelink with one another. Further, UEs 601-604 support a number of different RATs. For instance, UE 601 supports NR and LTE, UE 602 supports NR and LTE, UE 603 supports NR and/or LTE, and UE 604 supports NR and/or LTE. Accordingly, UEs supporting some RATs may communicate via sidelink with other UEs that support different RATs, such as with carrier aggregation.

Based on the above, it may be beneficial to address several issues to support efficient carrier aggregation on sidelink communications. For instance, it may be beneficial for a device or UE to determine whether carrier aggregation on sidelink is allowed while inside or outside of network coverage, as well as which carriers may be operated with carrier aggregation. Further, it may be beneficial for a device or UE to adapt to different carriers on sidelink dynamically based on the channel condition of a carrier. Also, it may be beneficial for a device or UE with multi-RAT co-existence to determine how packets are transmitted via different RAT carriers and/or with inter-RAT carrier aggregation to different UEs with different RAT capabilities.

Aspects of the present disclosure may provide a number of ways in which to support efficient carrier aggregation on sidelink communications. Aspects of the present disclosure may allow a device or UE to determine whether carrier aggregation on sidelink is allowed while inside or outside of network coverage, as well as which carriers may be operated with carrier aggregation. Moreover, aspects of the present disclosure may allow a device or UE to adapt to different carriers on sidelink dynamically based on the channel condition of a carrier. Aspects of the present disclosure may also allow a device or UE with multi-RAT co-existence to determine how packets are transmitted via different RAT carriers and/or with inter-RAT carrier aggregation to different UEs with different RAT capabilities.

Aspects of the present disclosure may allow a device to include an initial configuration for inter-RAT or intra-RAT sidelink carrier aggregation including one or more inter-RAT or intra-RAT CA parameters. The configuration for inter-RAT or intra-RAT sidelink carrier aggregation may be a pre-configuration, a common configuration via SIBs or other SIs, e.g., a set of common carriers for different services, and/or a UE-specific configuration via RRC assistance. Additionally, the configuration may be forwarded from a transmitting (Tx) device, e.g., a UE, to a receiving (Rx) device, e.g., at least one UE, with an PC5 RRC message.

Aspects of the present disclosure may also include a number of inter-RAT carrier aggregation configurations. For instance, when multiple RATs, e.g., NR and LTE or NR and WiFi, coexist within a wireless device, the device may be pre-configured if outside of a base station's coverage, as well as configured by a base station, e.g., a gNB or eNB, if within the base station's coverage. Also, the inter-RAT CA on sidelink communication with coexistence may include a number of parameters. For example, the inter-RAT CA parameters may include supporting sidelink inter-RAT CA with coexistence within a device, e.g., sl inter-RAT CA coexist. The inter-RAT CA parameters may also include carriers or carrier combinations allowed for inter-RAT CA with coexistence within a device, e.g., sl inter-RAT CA coexist carrier list or sl inter-RAT CA coexist carrier combined list. Further, the inter-RAT CA parameters may include carriers or carrier combinations blocked for inter-RAT CA with coexistence within a device, e.g., sl inter-RAT CA coexist carrier block list or sl inter-RAT CA coexist carrier combined block list.

Additionally, the parameters for inter-RAT CA on sidelink with coexistence may be configured via a number of configurations. For instance, the inter-RAT CA parameters may be configured via a pre-configuration, e.g., if outside of a network coverage. The inter-RAT CA parameters may also be configured via a configuration from a base station, e.g., a gNB or eNB, if within the base station's coverage, e.g., the coverage of the gNB or eNB. This may be a common configuration to all UEs in coverage and may use NR SIBs or LTE SIBs, respectively. Further, this may be a UE-specific configuration using RRCReconfiguration from a gNB or RRCConnectionReconfiguration from an eNB, respectively. The inter-RAT CA parameters may also be configured via a configuration with UE assistance to the gNB or eNB, respectively, via SidelinkUEInformationNR. Also, the inter-RAT CA parameters may be configured via a configuration forwarded from a Tx UE to at least one Rx UE that is outside of the coverage of the gNB or eNB, e.g., via PC5 RRC with unicast, groupcast, and/or broadcast.

Figure 7:
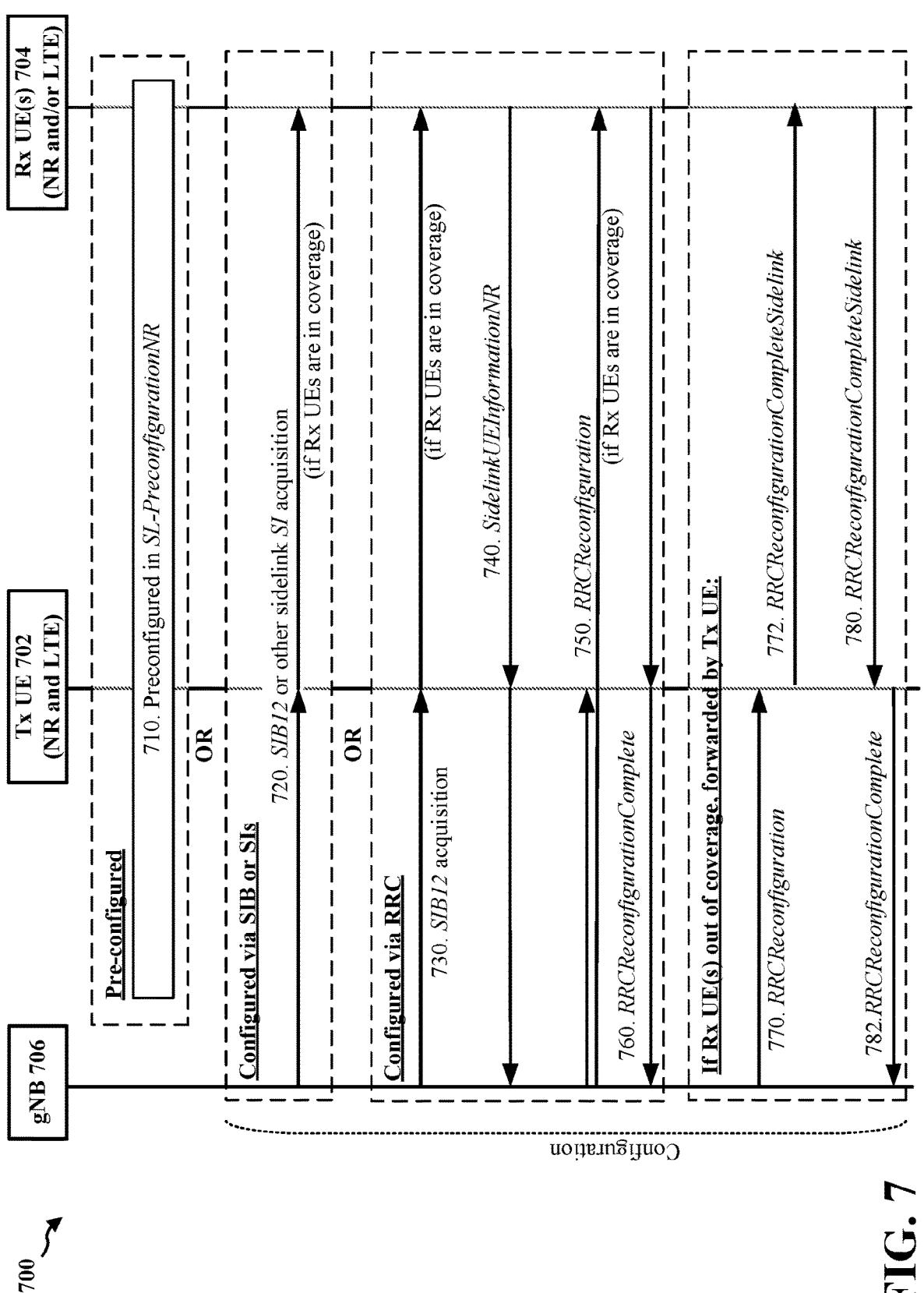
FIG. 7 is a diagram illustrating example communication between UEs and a base station.

FIG. 7 is a diagram 700 illustrating example communication between a base station or gNB 706, a Tx UE 702, and a Rx UE(s) 704. More specifically, diagram 700 includes communication for an inter-RAT CA configuration between the gNB 706, Tx UE 702 (supporting NR and LTE), and Rx UE(s) 704 (supporting NR and/or LTE). As depicted in FIG. 7, Tx UE 702 with NR and LTE co-existence and Rx UE(s) 704 with NR and LTE co-existence (or with either NR or LTE) may be pre-configured or configured by gNB 706 with sidelink NR-LTE CA with co-existence. As shown in FIG. 7, at 710, Tx UE 702 and Rx UE 704 may be configured via a pre-configuration with NR. For example, for UEs outside of the gNB's coverage, UEs with NR-LTE co-existence may be preconfigured with an NR preconfiguration (SL-Preconfigu-rationNR) including several parameters: sl-nr-lte-ca-coexist, sl-nr-lte-ca-coexist-carrier-list or sl-nr-lte-ca-coexist-carrier-combined-list, sl-nr-lte-ca-coexist-carrier-block-list or sl-nr-lte-ca-coexist-carrier-combined-block-list, etc.

As shown in FIG. 7, at 720, Tx UE 702 and Rx UE 704 may be configured with a common configuration via gNB SIB or SI(s). For example, for UEs within the gNB's coverage, UEs with NR-LTE co-existence may acquire SIB12 (e.g., sl-ConfigCommonNR) or other sidelink SI including several parameters: sl-nr-lte-ca-coexist, sl-nr-lte-ca-coexist-carrier-list or sl-nr-lte-ca-coexist-carrier-com-bined-list, sl-nr-lte-ca-coexist-carrier-block-list or sl-nr-lte-ca-coexist-carrier-combined-block-list, etc.

As illustrated in FIG. 7, Tx UE 702 and Rx UE 704 may also be configured with a UE-specific configuration via a gNB RRC. At 730, the UEs may start with a SIB12 acquisition for inter-RAT CA with NR and LTE co-existence configurations. If an inter-RAT CA with NR and LTE co-existence configurations is not received from the SIB12 acquisition, at 740, UEs with NR-LTE co-existence may send a request message with a suitable configuration for sidelink NR-LTE CA with co-existence by sending sidelink UE information to the gNB using SidelinkUEInforma-tionNR including sl-nr-lte-ca-coexist-capability, sl-nr-lte-ca-coexist-carrier-list-prefer or sl-nr-lte-ca-coexist-carrier-combined-list-prefer, sl-nr-lte-ca-coexist-carrier-block-list-prefer or sl-nr-lte-ca-coexist-carrier-combined-block-list-prefer, etc. In some instances, if Rx UE 704 is outside of the gNB's coverage, Tx UE 702 may forward Rx UE's information to the gNB. At 750, gNB 706 may transmit RRCReconfiguration (sl-ConfigDedicatedNR for NR or sl-ConfigDedicatedEUTRA for LTE) including sl-nr-lte-ca-coexist, sl-nr-lte-ca-coexist-carrier-list or sl-nr-lte-ca-coex-ist-carrier-combined-list, sl-nr-lte-ca-coexist-carrier-block-list or sl-nr-lte-ca-coexist-carrier-combined-block-list, etc. At 760, UEs 702 and/or 704 may send a confirmation to gNB 706 using RRCReconfigurationComplete.

As shown at 770 and 772 in FIG. 7, in some instances, if Rx UE 704 is outside of the gNB's coverage, Tx UE 702 may receive RRCReconfiguration from gNB 706, and Tx UE 702 may forward RRCReconfigurationCompleteSide-link to Rx UE 704. For unicast, the RRC parameters may be sent via a logic channel, such as a sidelink control channel (SCCH). For connection based groupcast, the RRC param-eters may be sent via a sidelink group control channel (SGCCH). For connectionless groupcast and broadcast, the RRC parameters may be sent via a sidelink common control channel (SCCCH). As shown at 780 and 782, the Rx UE 704 may send a RRCReconfigurationCompleteSidelink to the Tx UE 702, and the Tx UE 702 may send a RRCReconfigura-tionComplete to the gNB 706.

Figure 8:
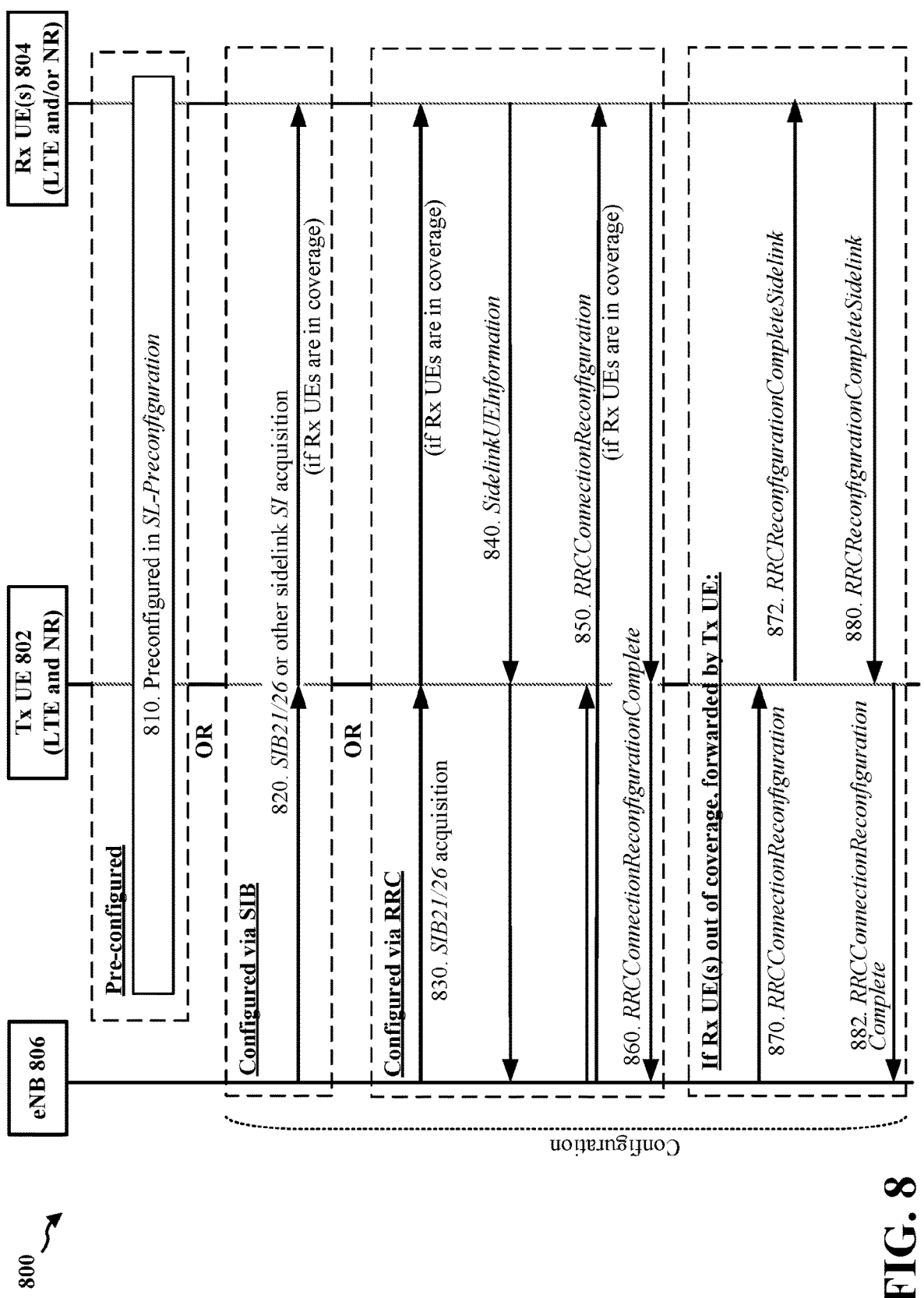
FIG. 8 is a diagram illustrating example communication between UEs and a base station.

FIG. 8 is a diagram 800 illustrating example communication between a base station or eNB 806, a Tx UE 702, and a Rx UE(s) 804. More specifically, diagram 800 includes communication for an inter-RAT CA configuration between the eNB 806, Tx UE 802, and Rx UE(s) 804. As illustrated in FIG. 8, Tx UE 802 with LTE and NR co-existence and Rx UE(s) 804 with LTE and NR co-existence (or either LTE or NR) may be pre-configured or configured by the eNB 806 with sidelink NR-LTE CA with co-existence. As shown in FIG. 8, at 810, Tx UE 802 and Rx UE 804 may be configured via a pre-configuration with LTE. For example, for UEs outside of the eNB's coverage, UEs with LTE-NR co-existence may be preconfigured with an LTE preconfiguration (SL-Preconfiguration) including sl-lte-nr-ca-coexist, sl-lte-nr-ca-coexist-carrier-list or sl-lte-nr-ca-coexist-carrier-combined-list, sl-lte-nr-ca-coexist-carrier-block-list or sl-lte-nr-ca-coexist-carrier-combined-block-list, etc. As shown in FIG. 8, at 820, Tx UE 802 and Rx UE 804 may be configured with a common configuration via eNB SIBs. For example, for UEs within the eNB's coverage, UEs with LTE-NR co-existence may acquire SIB21/26 acquisition (e.g., sl-V2X-ConfigCommon) or other sidelink SI with sl-lte-nr-ca-coexist, sl-lte-nr-ca-coexist-carrier-list or sl-lte-nr-ca-coexist-carrier-combined-list, sl-lte-nr-ca-coexist-carrier-block-list or sl-lte-nr-ca-coexist-carrier-combined-block-list, etc.

As shown in FIG. 8, Tx UE 802 and Rx UE 804 may be configured with a UE-specific configuration via an eNB RRC. At 830, UEs 802 and 804 may start with a SIB21/26 acquisition without co-existence configurations. If an inter-RAT CA with NR and LTE co-existence configurations is not received from the SIB/21/26 acquisition, at 840, UEs with NR-LTE co-existence may send a request with a suitable configuration for sidelink NR-LTE CA with co-existence by sending sidelink UE information to the eNB 806 using SidelinkUEInformation including sl-lte-nr-ca-co-exist-capability, sl-lte-nr-ca-coexist-carrier-list-prefer or sl-lte-nr-ca-coexist-carrier-combined-list-prefer, sl-lte-nr-ca-coexist-carrier-block-list-prefer or sl-lte-nr-ca-coexist-carrier-combined-block-list-prefer, etc. In some instances, if Rx UE 804 is outside of the eNB's coverage, Tx UE 802 may forward Rx UE's information to the eNB 806. At 850, eNB 806 may send RRCConnectionReconfiguration (sl-V2X-ConfigDedicated) including sl-lte-nr-ca-coexist, sl-lte-nr-ca-coexist-carrier-list or sl-lte-nr-ca-coexist-carrier-com-bined-list, sl-lte-nr-ca-coexist-carrier-block-list or sl-lte-nr-ca-coexist-carrier-combined-block-list, etc. At 860, UEs 802 and/or 804 may send a confirmation to eNB 806 using RRCConnectionReconfigurationComplete. As shown at 870 and 872 in FIG. 8, in some instances, if Rx UE 804 is outside of the eNB's coverage, eNB 806 may send RRCConnectionReconfiguration to Tx UE 802, and Tx UE 802 may forward RRC parameters (RRCReconfigurationComple-teSidelink) to Rx UE 804. As shown at 880 and 882, Rx UE 804 may send a RRCReconfigurationCompleteSidelink to Tx UE 802, and Tx UE 802 may send a RRCConnection-ReconfigurationComplete to the eNB 806.

Aspects of the present disclosure may also include a number of intra-RAT carrier aggregation configurations, e.g., NR carrier aggregation configurations. As indicated herein, a device may be pre-configured if outside of the network coverage or configured if inside of coverage for an intra-RAT carrier aggregation, respectively. The intra-RAT CA on sidelink, e.g., NR CA on sidelink, may include a number of parameters. For instance, the parameters for intra-RAT CA may include supporting sidelink NR CA, e.g., sl-NR-CA for supporting sidelink NR CA. The parameters for intra-RAT CA may also include carriers or carrier combinations allowed for NR CA, e.g., sl-NR-CA-carrier-list or sl-NR-CA-carrier-combined-list. The parameters for intra-RAT CA may also include carriers or carrier combi-nations blocked for NR CA, e.g., sl-NR-CA-carrier-block-list or sl-NR-CA-carrier-combined-block-list.

Additionally, the parameters for NR CA on sidelink may be configured via a pre-configuration (if a UE is outside of network coverage). The parameters for NR CA on sidelink may also be configured via a configuration from a gNB (if the UE is within the gNB's coverage). This may be a common configuration to all UEs in coverage using NR SIBs. This may also be a UE-specific configuration using RRCReconfiguration from the gNB. The parameters for NR CA on sidelink may also be configured via a configuration with a UE's assistance to the gNB via SidelinkUEInformationNR (containing the suitable configurations). The parameters for NR CA on sidelink may also be configured via a configu-ration forwarded from a Tx UE to a Rx UE(s) outside of the coverage from the gNB, e.g., via PC5 RRC with unicast, groupcast, and/or broadcast, as described previously.

In some aspects of the present disclosure, in order to reduce or avoid interference, a UE may dynamically adapt to different carriers (either inter-RAT carriers or intra-RAT carriers) for carrier aggregation on sidelink via inter-RAT or intra-RAT carrier selection/re-selection and an indication based on the measured channel condition of the inter-RAT or intra-RAT carrier configuration/pre-configuration. For side-link carrier selection/re-selection, a Tx UE may select car-riers based on a measurement. For sidelink carrier indication on sidelink to other UEs, there may be a PC5 RRC based configuration and reconfiguration message via a unicast, groupcast, and/or broadcast channel, as described previ-ously. Also, for sidelink carrier indication on sidelink to other UEs, there may be a MAC-CE based sidelink carrier activation and deactivation for unicast, groupcast, and/or broadcast.

Figure 9:
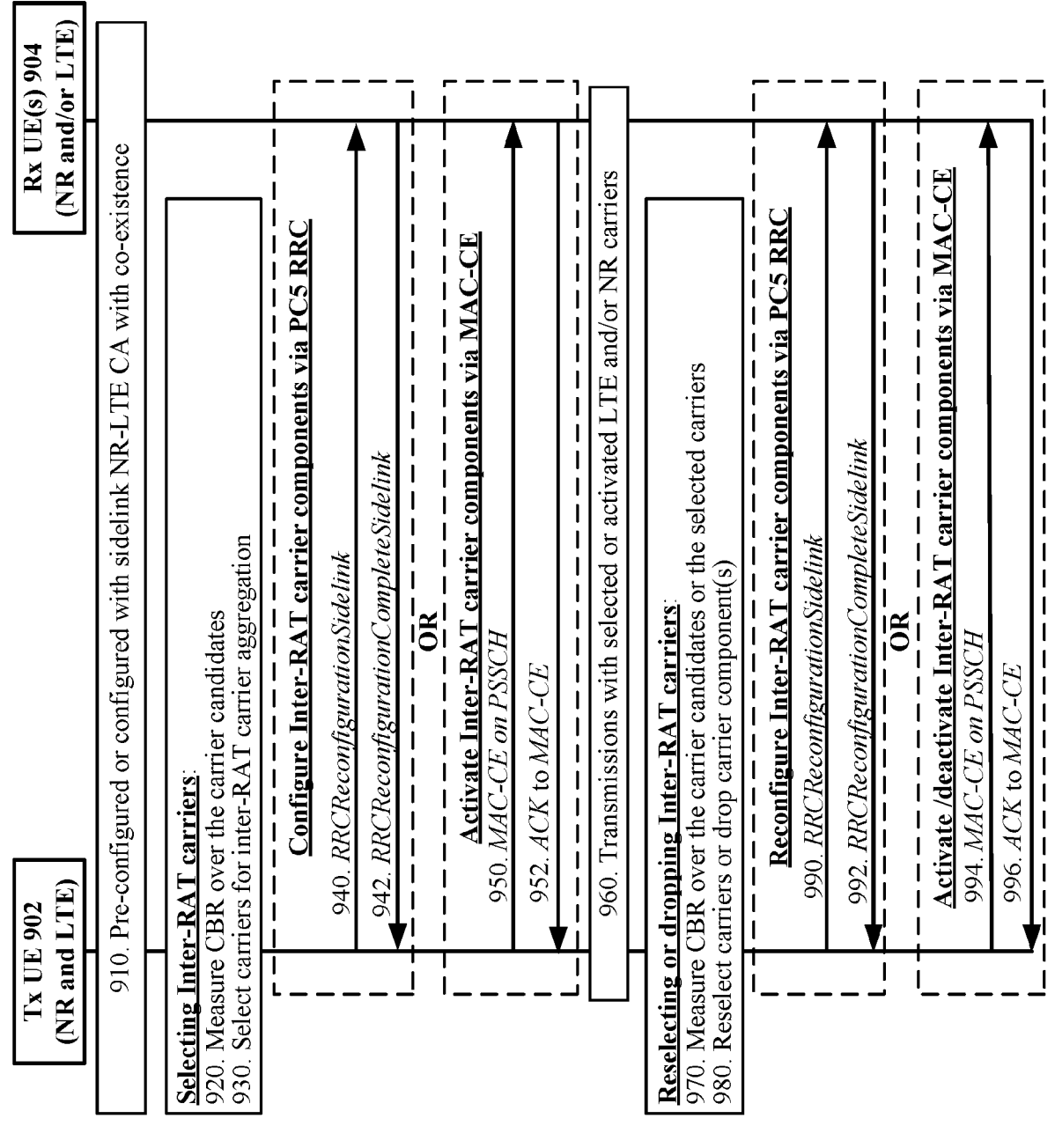
FIG. 9 is a diagram illustrating example communication between UEs.

FIG. 9 is a diagram 900 illustrating example communi-cation between a Tx UE 902 and a Rx UE 904. More specifically, diagram 900 includes communication for an inter-RAT carrier selection/re-selection and an indication between the Tx UE 902 and Rx UE(s) 904. As illustrated in FIG. 9, sidelink carriers of different RATs may be selected/re-selected and indicated using NR and LTE coexistence within a device. At 910, Tx UE 902 and Rx UE 904 may be pre-configured or configured with an NR preconfiguration (SL-PreconfigurationNR) including sl-nr-lte-ca-coexist, sl-nr-lte-ca-coexist-carrier-list or sl-nr-lte-ca-coexist-carrier-combined-list, sl-nr-lte-ca-coexist-carrier-block-list or sl-nr-lte-ca-coexist-carrier-combined-block-list, etc.

As shown in FIG. 9, UEs according to the present disclosure may select inter-RAT carriers either via an LTE or NR carrier selection. At 920, for LTE and/or NR, a UE may measure the channel busy ratio (CBR) over the carrier candidates, e.g., sl-nr-lte-ca-coexist-carrier-list or sl-nr-lte-ca-coexist-carrier-combined-list. At 930, for LTE and/or NR carrier candidates, a UE may select LTE and/or NR carriers for inter-RAT carrier aggregation, e.g., sl-lte-ca-coexist-carrier-list1 and sl-nr-ca-coexist-carrier-list1, if the mea-surement is below a configured threshold, e.g., an LTE threshold for LTE carriers or an NR threshold for NR carriers where LTE threshold may be lower (more stringent) than an NR threshold in order to keep NR's impact to LTE at a minimum while aggregating LTE's carriers for NR transmissions. LTE carriers may be selected or reselected by either NR carrier selection function or LTE carrier selection function on the device with NR and LTE coexistence. If an LTE carrier selection function (i.e., in LTE mode) is used for selecting or reselecting LTE carriers, then the selected carriers may be forwarded to an NR carrier selection func-tion or an NR MAC control function. Further, as shown in FIG. 9, UEs according to the present disclosure may send selected or reselected inter-RAT carrier components via a PC5 RRC message. For instance, at 940, UE 902 may transmit RRCReconfigurationSidelink with selected LTE and/or NR carriers (e.g., sl-lte-ca-coexist-carrier-list1 and sl-nr-ca-coexist-carrier-list1) to UE(s) 904. At 942, at least one ULE 904 may transmit RRCReconfigurationComple-teSidelink to UE 902 to confirm the selected LTE and/or NR carriers. UEs according to the present disclosure may also activate selected or reselected inter-RAT carrier components (i.e., LTE and/or NR carriers) via a MAC-CE. For instance, at 950, Tx UE 902 may transmit a MAC-CE to Rx UE(s) 904 on a PSSCH to activate with the selected LTE and/or NR carriers sl-lte-ca-coexist-carrier-list1 and sl-nr-ca-coexist-carrier-list1. At 952, at least one Rx UE 904 may transmit an ACK to the MAC-CE for the selected LTE and/or NR carriers. As shown at 960, UEs may start transmissions with selected or activated LTE and/or NR carriers, i.e., LTE-NR carrier aggregation. In another example, Tx UE 902 may transmit a MAC-CE to Rx UE(s) 904 on a PSSCH to deactivate inter-RAT carrier components, and at least one Rx UE 904 may transmit an ACK to the MAC-CE for the deactivation.

As shown in FIG. 9, UEs according to the present disclosure may also reselect or drop inter-RAT carriers. At 970, for LTE and/or NR, Tx UE 902 may measure the CBR over the carrier candidates, e.g., sl-nr-lte-ca-coexist-carrier-list or sl-nr-lte-ca-coexist-carrier-combined-list, or the selected carriers sl-lte-ca-coexist-carrier-list1 and sl-nr-ca-coexist-carrier-list1. At 980, for LTE and/or NR, Tx UE 902 may reselect carriers, e.g., sl-lte-ca-coexist-carrier-list2 and sl-nr-ca-coexist-carrier-list2. Alternatively, Tx UE 902 may decide to drop carrier component(s) due to several factors, e.g., UE capability, congestion, and/or link failure and update the carrier list accordingly.

Additionally, UEs according to the present disclosure may also reconfigure inter-RAT carrier components via PC5 RRC based on the reselected carriers or carrier dropping. For instance, at 990, Tx UE 902 may transmit RRCReconfigurationSidelink with the reselected or updated LTE and/or NR carriers (e.g., sl-lte-ca-coexist-carrier-list2 and sl-nr-ca-coexist-carrier-list2) to Rx UE(s) 904. At 992, at least one Rx UE 904 may transmit RRCReconfigurationCompleteSidelink to Tx UE 902. Alternatively, UEs according to the present disclosure may also activate (i.e., to use) or deactivate (i.e., to drop) the reselected multi-RAT carrier components via a MAC-CE. For instance, at 994, Tx UE 902 may transmit a MAC-CE on a PSSCH to Rx UE(s) 904 in order to activate or deactivate with reselected LTE and/or NR carriers sl-lte-ca-coexist-carrier-list2 and sl-nr-ca-coexist-carrier-list2. At 996, at least one Rx UE 904 may transmit an ACK to the MAC-CE to Tx UE 902 for the activation or deactivation to the reselected LTE and/or NR carriers.

Alternatively, at 902 and 930 or 970 and 980 of FIG. 9, Tx UE 902 may receive measurements over LTE and/or NR carrier candidates via a PC5 RRC message or sidelink UE information message from at least one Rx UE 904, and select or reselect or drop carriers according to the measurement received. For example, carriers with good or suitable measurements from Rx UE(s) 904 may be considered for carrier selection; carriers with poor measurements from Rx UE(s) or cannot be supported by Rx UE(s) may be excluded for selection. For another example, LTE carriers may be measured by LTE carrier selection from Rx UE(s) operating in LTE mode and NR carriers may be measured by NR carrier selection from Rx UE(s) operating in NR mode which may be taken into account for LTE and/or NR carrier selection by Tx UE 902.

Alternatively, at 902 and 930 or 970 and 980 of FIG. 9, Tx UE 902 may receive preferred or selected or not supported LTE and/or NR carriers via a PC5 RRC message or sidelink UE information message from at least one Rx UE 904, and then select or reselect or drop carriers accordingly. For example, carriers with good or suitable measurements may be preferred or selected by Rx UE(s) 904; carriers with poor measurements or cannot be supported may be excluded by Rx UE(s) for selection or reselection. For another example, LTE carriers may be selected or reselected by Rx UE(s) operating in LTE mode and NR carriers may be selected or reselected by Rx UE(s) operating in NR mode, which may be taken into account for LTE and/or NR carrier selection, reselection or dropping by Tx UE 902.

Figure 10:
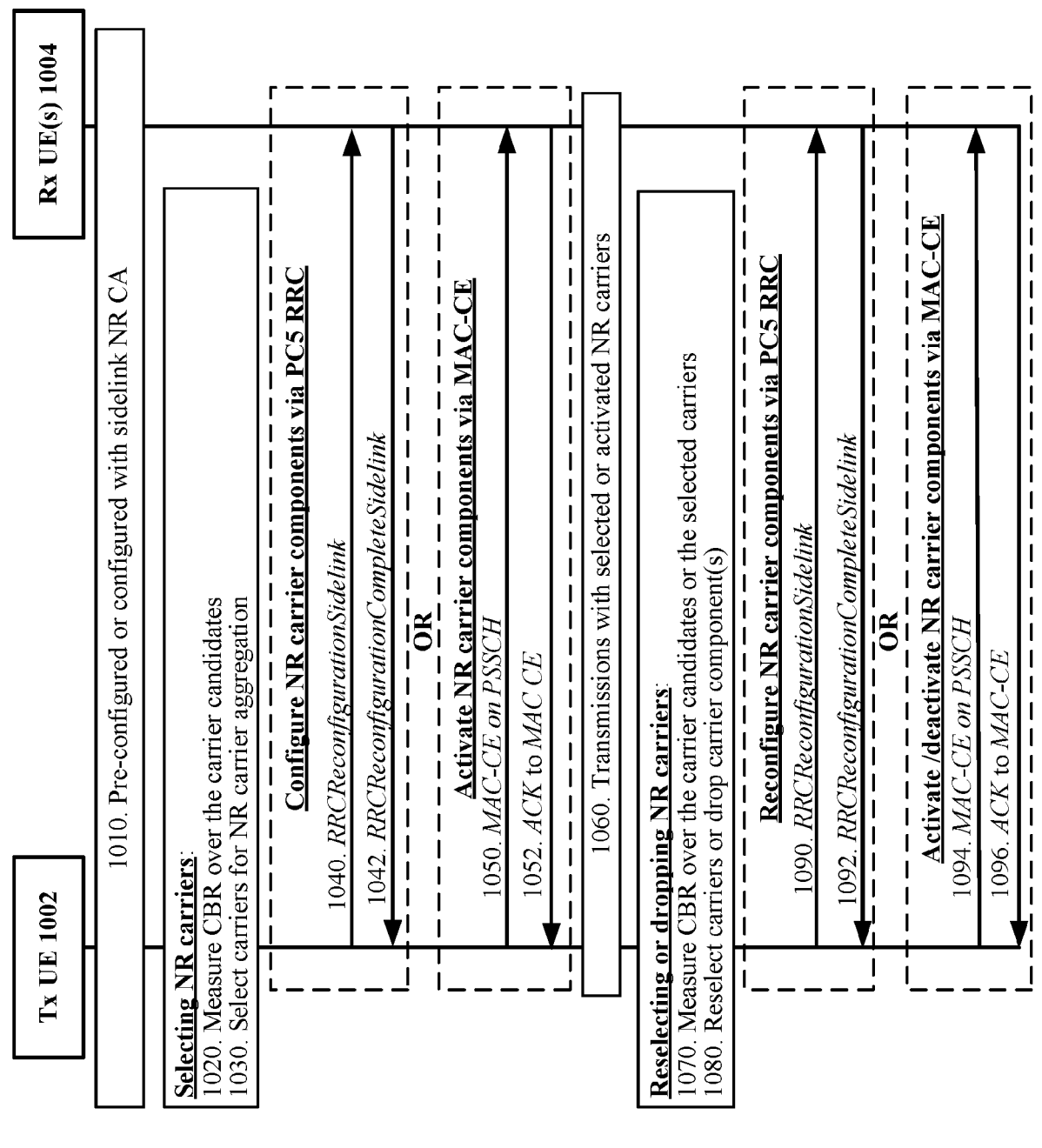
FIG. 10 is a diagram illustrating example communication between UEs.

FIG. 10 is a diagram 1000 illustrating example communication between a Tx UE 1002 and a Rx UE 1004. More specifically, diagram 1000 includes communication for an intra-RAT carrier selection/re-selection and indication between the Tx UE 1002 and Rx UE 1004. As illustrated in FIG. 10, sidelink carriers of a RAT may be selected/reselected and indicated, e.g., using NR for the intra-RAT. At 1010, Tx UE 1002 and Rx UE 1004 may be pre-configured or configured with an NR preconfiguration of SL NR CA (SL-PreconfigurationNR) including sl-nr-ca, sl-nr-ca-carrier-list or sl-nr-ca-carrier-combined-list, sl-nr-ca-carrier-block-list or sl-nr-ca-carrier-combined-block-list, etc. As shown in FIG. 10, UEs according to the present disclosure may select NR carriers via an NR carrier selection. At 1020, Tx UE 1002 may measure a CBR over the carrier candidates, e.g., sl-nr-ca-carrier-list or sl-nr-ca-carrier-combined-list. At 1030, Tx UE 1002 may select carriers for carrier aggregation, e.g., sl-nr-ca-carrier-list1, if the measurement is below a configured threshold.

As shown in FIG. 10, UEs according to the present disclosure may also send the selected NR carrier components via a PC5 RRC. At 1040, Tx UE 1002 may transmit RRCReconfigurationSidelink with the selected NR carriers (e.g., sl-nr-ca-carrier-list1) to Rx UE(s) 1004. At 1042, at least one Rx UE 1004 may transmit RRCReconfigurationCompleteSidelink for the selected NR carriers. UEs according to the present disclosure may also activate selected NR carrier components via a MAC-CE. At 1050, Tx UE 1002 may transmit a MAC-CE on a PSSCH to Rx UE(s) 1004 to activate with the selected NR carriers sl-nr-ca-coexist-carrier-list1. At 1052, at least one Rx UE 1004 may transmit an ACK to the MAC-CE for the selected NR carriers.

Additionally, as shown in FIG. 10, UEs according to the present disclosure may include NR carrier aggregation. At 1060, Tx UE 1002 and Rx UE 1004 may include transmissions with the selected or activated NR carriers. UEs according to the present disclosure may also reselect or drop NR carriers. At 1070, Tx UE 1002 may measure the CBR over the carrier candidates, e.g., sl-nr-ca-carrier-list or sl-nr-ca-carrier-combined-list, or the selected carriers sl-nr-ca-carrier-list1. At 1080, Tx UE 1002 may reselect carriers, e.g., sl-nr-ca-carrier-list2. Tx UE 1002 may also decide to drop carrier component(s) due to several factors, e.g., UE capability, congestion, and/or link failure. As shown in FIG. 10, UEs according to the present disclosure may also send reselected (e.g., per the measurements) or updated (e.g., per the dropping) NR carrier components via a PC5 RRC to Rx UE(s) 1004. At 1090, Tx UE 1002 may transmit RRCReconfigurationSidelink with the reselected or updated NR carriers (e.g., sl-nr-ca-carrier-list2) to Rx UE(s) 1004. At 1092, at least one Rx UE 1004 may transmit RRCReconfigurationCompleteSidelink for the reselected or updated NR carriers. Alternatively, at 1094, Tx UE 1002 may activate (e.g., reselect or update) or deactivate (e.g., drop) the selected NR carrier components via a MAC-CE, such as via a MAC-CE on a PSSCH with sl-nr-ca-carrier-list2. At 1096, at least one Rx UE 1004 may transmit, to Tx UE 1002, an ACK to the MAC-CE for the activated or deactivated NR carriers.

Alternatively, at 1002 and 1030 or 1070 and 1080 of FIG. 10, Tx UE 1002 may receive measurements over NR carrier candidates via a PC5 RRC message or sidelink UE information message from at least one Rx UE 1004, and select or reselect or drop carriers according to the measurements received. For example, carriers with good or suitable measurements from Rx UE(s) 1004 may be considered for carrier selection or reselection; carriers with poor measurements from Rx UE(s) or cannot be supported by Rx UE(s) may be excluded or dropped for selection or reselection.

Alternatively, at 1002 and 1030 or 1070 and 1080 of FIG. 10, Tx UE 1002 may receive preferred or selected or not supported NR carriers via a PC5 RRC message or sidelink UE information message from at least one Rx UE 904, and then select or reselect or dropped carriers accordingly. For example, carriers with good or suitable measurements may be preferred or selected by Rx UE(s) 904; carriers with poor measurements or cannot be supported may be excluded by Rx UE(s) for selection or reselection.

Alternatively, at 902 and 930 or 970 and 980 of FIG. 9 or at 1002 and 1030 or 1070 and 1080 of FIG. 10, Tx UE 902 or Tx UE 1002 may receive measurements over carrier candidates via PC5 RRC message or sidelink UE information message from a special UE, such as an RSU, group lead, cluster lead or scheduling UE, and select or reselect or drop carriers according to the measurements received. For example, carriers with good or suitable measurements may be considered for carrier selection or reselection; carriers with poor measurements or blocked carriers may be excluded or dropped for selection or reselection.

Alternatively, at 902 and 930 or 970 and 980 of FIG. 9 or at 1002 and 1030 or 1070 and 1080 of FIG. 10, Tx UE 902 or Tx UE 1002 may receive preferred or selected or block carriers via a PC5 RRC message or sidelink UE information message from a special UE, such as an RSU, group lead, cluster lead or scheduling UE, and then select or reselect or drop carriers accordingly. For example, carriers with good or suitable measurements may be preferred or selected; carriers with poor measurements or blocked carriers may be excluded by the special UE for selection or reselection.

For some embodiments, the Tx UE, e.g., Tx UE 902 in FIG. 9 or Tx UE 1002 in FIG. 10, may be an RSU for carrier configuration, selection, reselection and deselection in the proximity; for some embodiments, the Tx UE, e.g., Tx UE 902 in FIG. 9 or Tx UE 1002 in FIG. 10, may be a group lead or a cluster head for carrier configuration, selection, reselection and deselection in the group or cluster; for some embodiments, the Tx UE, e.g., Tx UE 902 in FIG. 9 or Tx UE 1002 in FIG. 10, may be a scheduling UE for carrier configuration, selection, reselection and deselection and scheduling the other UEs accordingly.

For some embodiments, the Rx UE(s), e.g., Rx UE(s) 904 in FIG. 9 or Rx UE(s) 1004 in FIG. 10, may be a UE paired for unicast; for some embodiments, the Rx UE(s), e.g., Rx UE(s) 904 in FIG. 9 or Rx UE(s) 1004 in FIG. 10, may be UEs within a group for connection based groupcast; for some embodiments, the Rx UE(s), e.g., Rx UE(s) 904 in FIG. 9 or Rx UE(s) 1004 in FIG. 10, may be UEs within a certain range for distance based groupcast; for some embodiments, the Rx UE(s), e.g., Rx UE(s) 904 in FIG. 9 or Rx UE(s) 1004 in FIG. 10, may be UEs in proximity participating in a broadcast. For some embodiments, a response or acknowledgement from one Rx UE may be needed; for some embodiments, responses or acknowledgements from UEs within a certain range may be needed; for some embodiments, responses or acknowledgements from all UEs may be needed, which may be depend on the cast type, latency, reliability, priority, channel congestion, etc.

In some aspects, for a device supporting both LTE and NR, NR packets may be transmitted with different RAT carriers or with inter-RAT carrier aggregation to different UEs with different RAT capabilities with various mechanisms. The NR packets may be aggregated with NR transmissions on NR and/or LTE carriers. Also, a UE's NR or LTE carrier selection function may select LTE carriers. A UE's LTE carrier selection function may also forward selected carriers to a UE's NR carrier selection function if an LTE carrier selection function selects LTE carriers. Further, UEs may use an NR MAC and PHY over selected LTE carriers for NR packet transmissions.

Figure 11:
FIG. 11 is a diagram illustrating an example carrier selection process.

FIG. 11 is a diagram 1100 illustrating an example carrier selection process including LTE MAC 1110 and NR MAC 1120. More specifically, FIG. 11 includes CA with LTE and NR, i.e., NR carrier selection. As illustrated in FIG. 11, CA with aggregated LTE and/or NR carriers may be performed in a number of ways. For instance, a UE's NR carrier selection function may select both LTE and NR carriers, e.g., sl-lte-ca-coexist-carrier-list and sl-nr-ca-coexist-carrier-list, based on the measurements of CBR, RSRP, and/or RSSI over the configured carriers, e.g., sl-nr-lte-ca-coexist-carrier-list or sl-nr-lte-ca-coexist-carrier-combined-list. Further, NR packets, e.g., Tbi and TBj, carried on NR physical signals and channels may be transmitted over an LTE carrier, e.g., LTE Carrier i, and/or an NR carrier, e.g., NR Carrier j.

Figure 12:
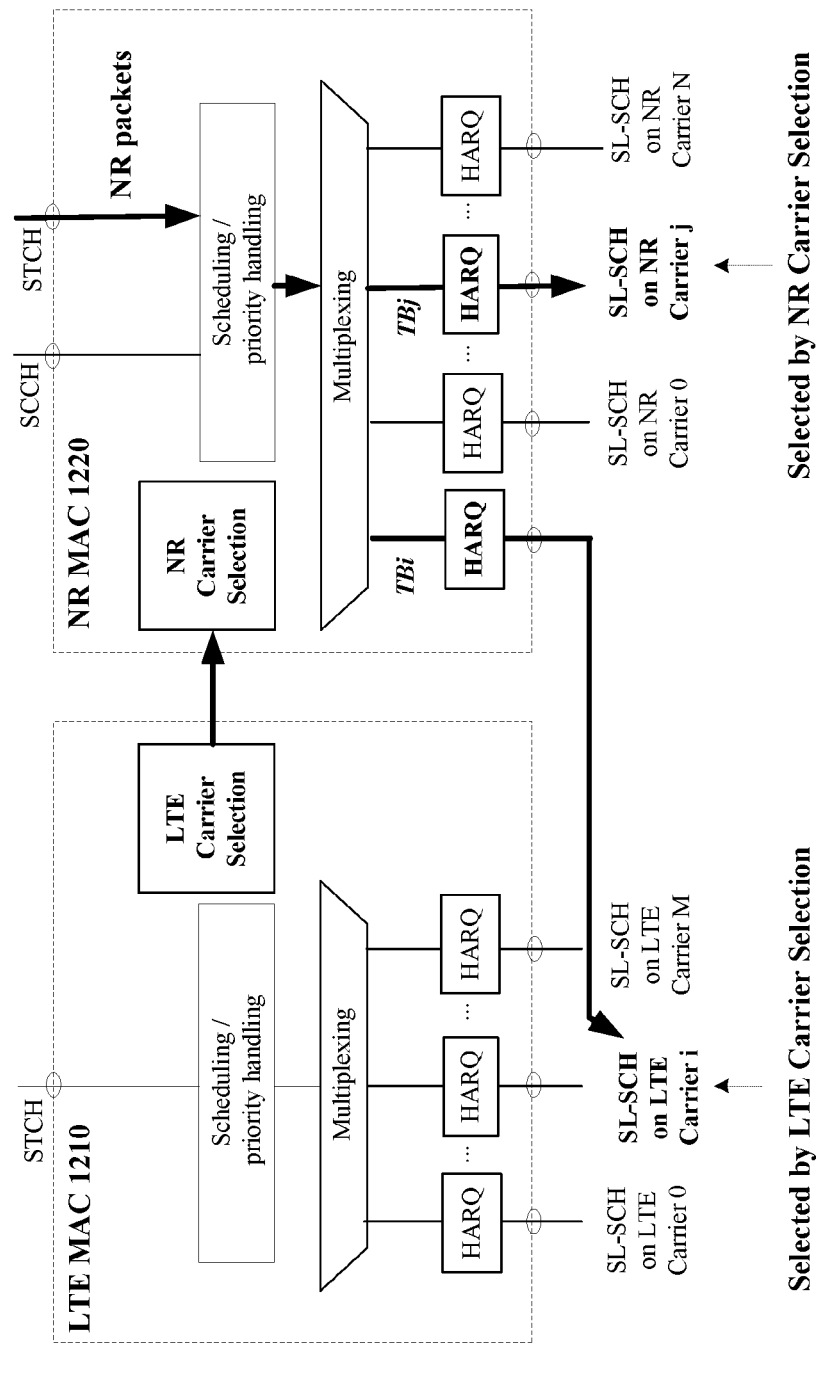
FIG. 12 is a diagram illustrating an example carrier selection process.

FIG. 12 is a diagram 1200 illustrating an example carrier selection process including LTE MAC 1210 and NR MAC 1220. More specifically, FIG. 12 includes CA with LTE and NR, i.e., NR and LTE carrier selection. As illustrated in FIG. 12, CA with aggregated LTE and NR carriers may be performed in a number of ways. For instance, a UE's NR carrier selection function may select NR carriers and a UE's LTE carrier selection function may select LTE carriers, e.g., sl-lte-ca-coexist-carrier-list and sl-nr-ca-coexist-carrier-list, based on the measurements of CBR and/or RSRP over the configured carriers, e.g., sl-nr-lte-ca-coexist-carrier-list or sl-nr-lte-ca-coexist-carrier-combined-list. Also, a UE's LTE carrier selection function may forward LTE carriers selected to a UE's NR carrier selection function or a UE's NR MAC control. NR packets, e.g., Tbi and TBj, carried on NR physical signals and channels may be transmitted over an LTE carrier, e.g., LTE Carrier i, and/or an NR carrier, e.g., NR Carrier j.

To minimize the impact to LTE UEs while aggregating LTE carriers for NR packets, there are multiple ways for designs according to the present disclosure. For example, the measurement threshold for selecting LTE carriers may be much lower than the threshold for selecting NR carriers to avoid congesting LTE carriers with NR packet transmissions. For example, the NR transmissions may also contain LTE's signaling, e.g., LTE's sidelink control information (SCI) for LTE UEs to understand an NR UE's usage on LTE carriers. Also, LTE UEs may be detected by the LTE function (e.g., carrier selection, sensing, or device discovery, etc.) on the device, and LTE carrier selection and usage may be adjusted accordingly to avoid impact to LTE UEs.

Figure 13:
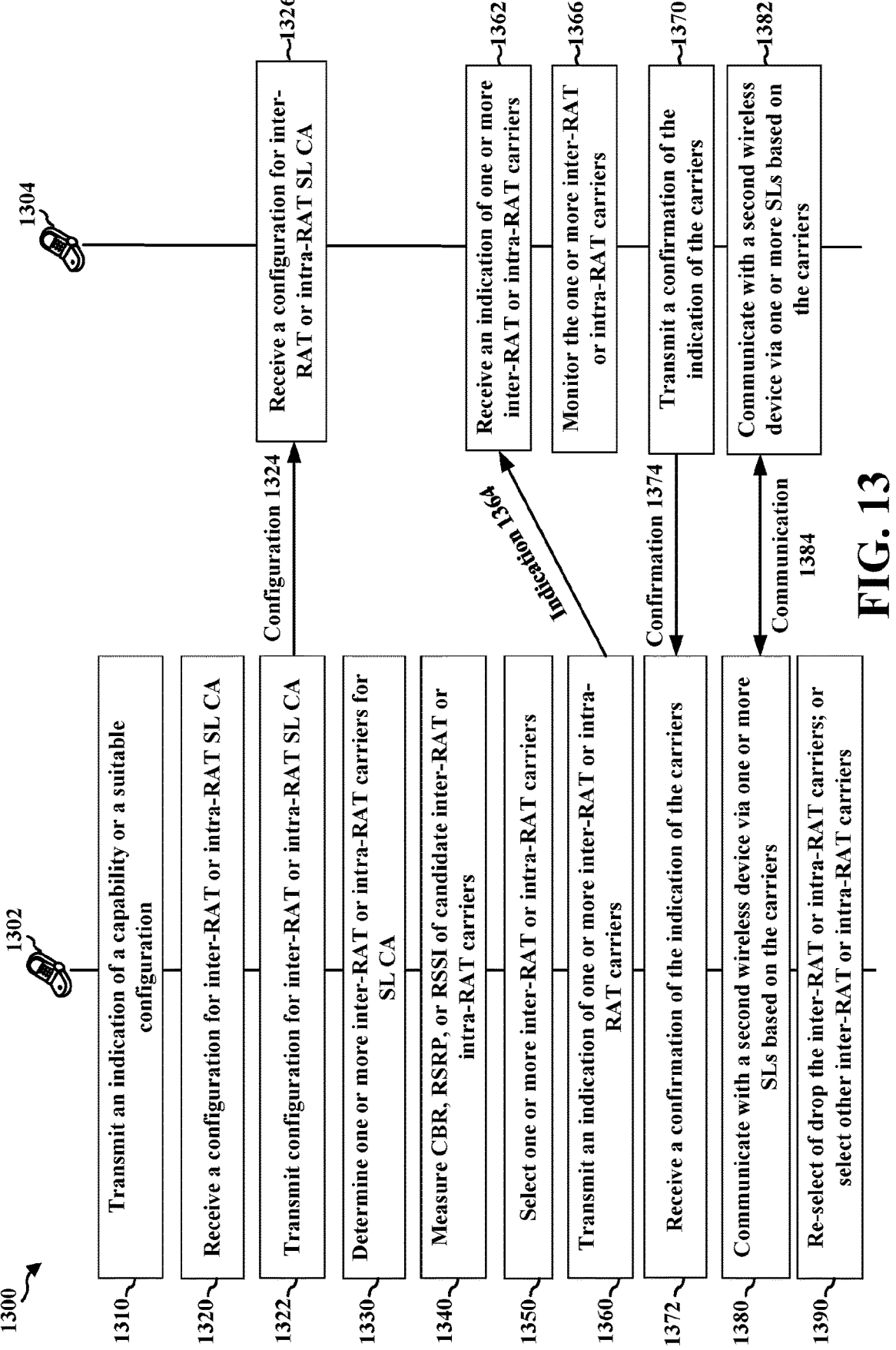
FIG. 13 is a diagram illustrating example communication between wireless devices.

FIG. 13 is a diagram 1300 illustrating communication between wireless device 1302 and wireless device 1304. The wireless device 1302 may correspond to UE 104, 350, 702, 802, 902, 1002, and apparatus 1602, and the wireless device 1304 may correspond to UE 104, 350, 704, 804, 904, 1004, and apparatus 1702.

At 1310, wireless device 1302 may transmit, to a base station, at least one of an indication of a capability of a first wireless device or a suitable configuration for inter-radio access technology (inter-RAT) or intra-RAT sidelink (SL) carrier aggregation (CA).

At 1320, wireless device 1302 may receive a configuration for inter-radio access technology (inter-RAT) or intra-RAT sidelink (SL) carrier aggregation (CA) including one or more inter-RAT or intra-RAT CA parameters. In some aspects, if the first wireless device is within a coverage of a base station, the configuration for inter-RAT or intra-RAT SL CA may be received from the base station via radio resource control (RRC) signaling, where the configuration is a user equipment (UE)-specific configuration. If the first wireless device is within a coverage of a base station, the configuration for inter-RAT or intra-RAT SL CA may be received from the base station via system information (SI) or a system information block (SIB), where the configuration is a common configuration. If the first wireless device is outside of a coverage of a base station, the first wireless device may be preconfigured with the configuration for inter-RAT or intra-RAT SL CA. Also, the one or more inter-RAT or intra-RAT CA parameters may be associated with at least one of sidelink inter-RAT CA with coexistence or intra-RAT CA, one or more carriers or carrier combinations for inter-RAT CA with coexistence or intra-RAT CA, or one or more carriers or carrier combinations blocked for inter-RAT CA with coexistence or intra-RAT CA.

At 1322, wireless device 1302 may transmit, to at least one second wireless device, a configuration for inter-RAT or intra-RAT SL CA, e.g., configuration 1324. At 1326, wireless device 1304 may receive a configuration for inter-radio access technology (inter-RAT) or intra-RAT sidelink (SL) carrier aggregation (CA) including one or more inter-RAT or intra-RAT CA parameters, e.g., configuration 1324. The first wireless device may support communication via one or more RATs for inter-RAT or intra-RAT CA, the one or more RATs including at least one of new radio (NR) or long-term evolution (LTE). Also, the first wireless device may support communication via multiple RATs and the at least one second wireless device supports communication via at least one RAT. In some aspects, if the first wireless device is outside of a coverage of a base station, the configuration for inter-RAT or intra-RAT SL CA may be received from the second device.

At 1330, wireless device 1302 may determine one or more inter-RAT or intra-RAT carriers for SL CA based on the configuration for inter-RAT or intra-RAT SL CA.

At 1340, wireless device 1302 may measure at least one of a channel busy ratio (CBR), a reference signal received power (RSRP), or a received signal strength indicator (RSSI) of each of the plurality of candidate inter-RAT or intra-RAT carriers.

At 1350, wireless device 1302 may select the one or more inter-RAT or intra-RAT carriers from a plurality of candidate inter-RAT or intra-RAT carriers based on the configuration for inter-RAT or intra-RAT SL CA. In some aspects, the one or more inter-RAT or intra-RAT carriers may be selected based on the measurement of at least one of the CBR, RSRP, or RSSI of each of the plurality of candidate inter-RAT or intra-RAT carriers.

At 1360, wireless device 1302 may transmit, to at least one second wireless device, an indication of the one or more inter-RAT or intra-RAT carriers for SL CA, e.g., indication 1364. The indication of the one or more inter-RAT or intra-RAT carriers may be transmitted via radio resource control (RRC) signaling or a medium access control (MAC) control element (MAC-CE). At 1362, wireless device 1304 may receive, from a second wireless device, an indication of one or more inter-RAT or intra-RAT carriers for SL CA, e.g., indication 1364. At 1366, wireless device 1304 may monitor, based on the received indication, the one or more inter-RAT or intra-RAT carriers for SL CA.

At 1370, wireless device 1304 may transmit, to the second wireless device, a confirmation of the indication of the one or more inter-RAT or intra-RAT carriers, e.g., confirmation 1374, where the confirmation of the indication of the one or more inter-RAT or intra-RAT carriers is transmitted via radio resource control (RRC) signaling or an acknowledgement (ACK) to a medium access control (MAC) control element (MAC-CE). At 1372, wireless device 1302 may receive, from the at least one second wireless device, a confirmation of the indication of the one or more inter-RAT or intra-RAT carriers, e.g., confirmation 1374. The confirmation of the indication of the one or more inter-RAT or intra-RAT carriers may be received via radio resource control (RRC) signaling or an acknowledgement (ACK) to a medium access control (MAC) control element (MAC-CE).

At 1380, wireless device 1302 may communicate, e.g., communication 1384, with the at least one second wireless device, e.g., wireless device 1304, via one or more sidelinks (SLs) based on the one or more inter-RAT or intra-RAT carriers for SL CA. At 1382, wireless device 1304 may communicate, e.g., communication 1384, with the second wireless device, e.g., wireless device 1302, via one or more sidelinks (SLs) based on the one or more inter-RAT or intra-RAT carriers for SL CA. In some instances, one or more packets for a first RAT may be communicated via at least one of a first RAT carrier or a second RAT carrier.

At 1390, wireless device 1302 may re-select or drop the one or more inter-RAT or intra-RAT carriers from the plurality of candidate inter-RAT or intra-RAT carriers; or select one or more other inter-RAT or intra-RAT carriers from the plurality of candidate inter-RAT or intra-RAT carriers, where the one or more other inter-RAT or intra-RAT carriers are selected if the one or more inter-RAT or intra-RAT carriers are dropped. Wireless device 1302 may also measure at least one of a channel busy ratio (CBR), a reference signal received power (RSRP), or a received signal strength indicator (RSSI) of the plurality of candidate inter-RAT or intra-RAT carriers, where the one or more inter-RAT or intra-RAT carriers are re-selected or dropped based on the measurement and the one or more other inter-RAT or intra-RAT carriers are selected based on the measurement.

Figure 14:
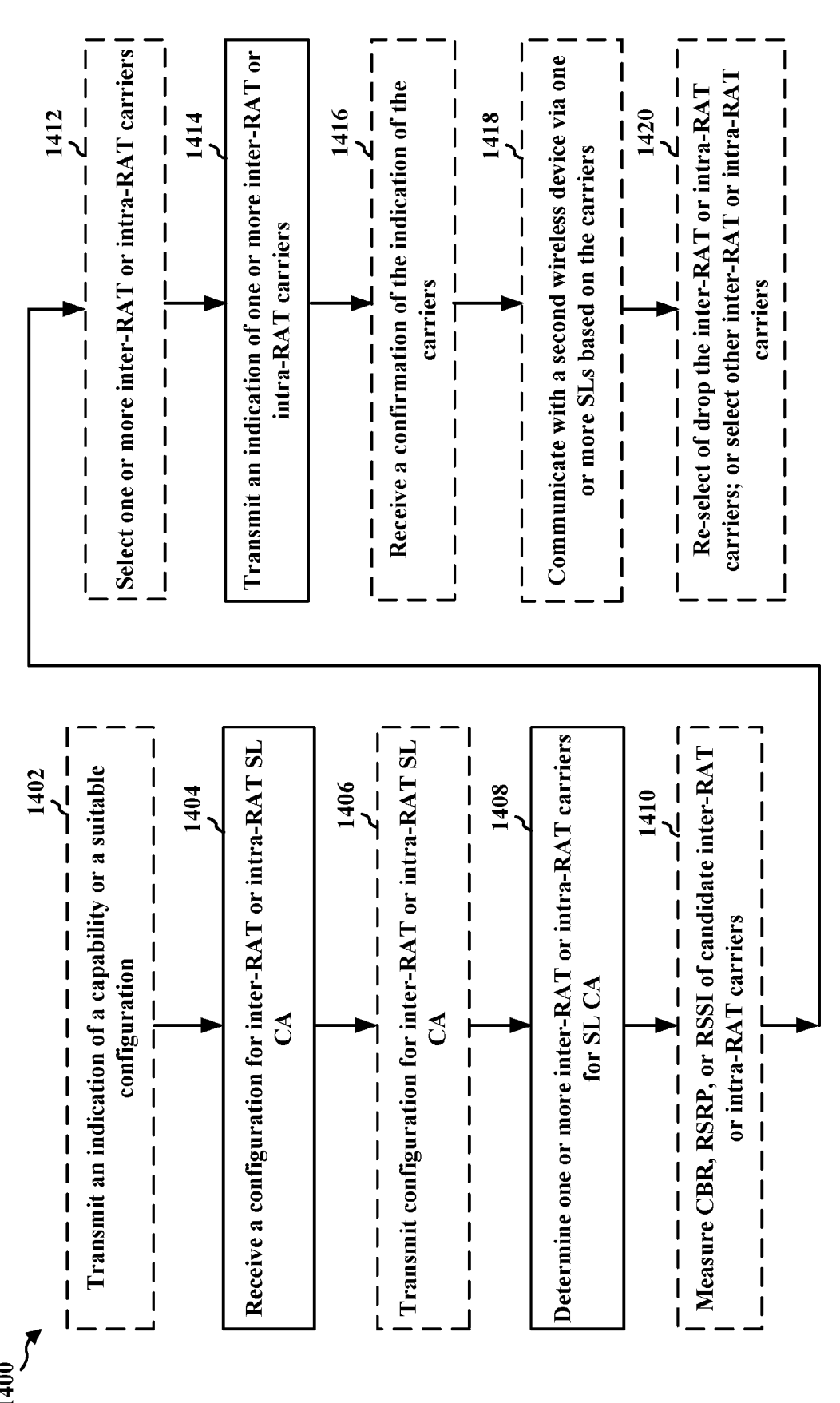
FIG. 14 is a flowchart of a method of wireless communication.

FIG. 14 is a flowchart 1400 of a method of wireless communication. The method may be performed by an apparatus, such as a UE or a component of a UE (e.g., the UE 104, 350, 702, 802, 902, 1002, and apparatus 1602). Optional aspects are illustrated with a dashed line. The methods described herein can provide a number of benefits, such as improving communication signaling, resource utilization, and/or power savings.

At 1402, the apparatus may transmit, to a base station, at least one of an indication of a capability of a first wireless device or a suitable configuration for inter-radio access technology (inter-RAT) or intra-RAT sidelink (SL) carrier aggregation (CA), as described in connection with the examples in FIGS. 4-13. For example, as described in 1310 of FIG. 13, wireless device 1302 may transmit, to a base station, at least one of an indication of a capability of a first wireless device or a suitable configuration for inter-RAT or intra-RAT SL CA. Further, 1402 may be performed by determination component 1640 in FIG. 16.

At 1404, the apparatus may receive a configuration for inter-radio access technology (inter-RAT) or intra-RAT sidelink (SL) carrier aggregation (CA) including one or more inter-RAT or intra-RAT CA parameters, as described in connection with the examples in FIGS. 4-13. For example, as described in 1320 of FIG. 13, wireless device 1302 may receive a configuration for inter-RAT or intra-RAT SL CA including one or more inter-RAT or intra-RAT CA parameters.

Figure 16:
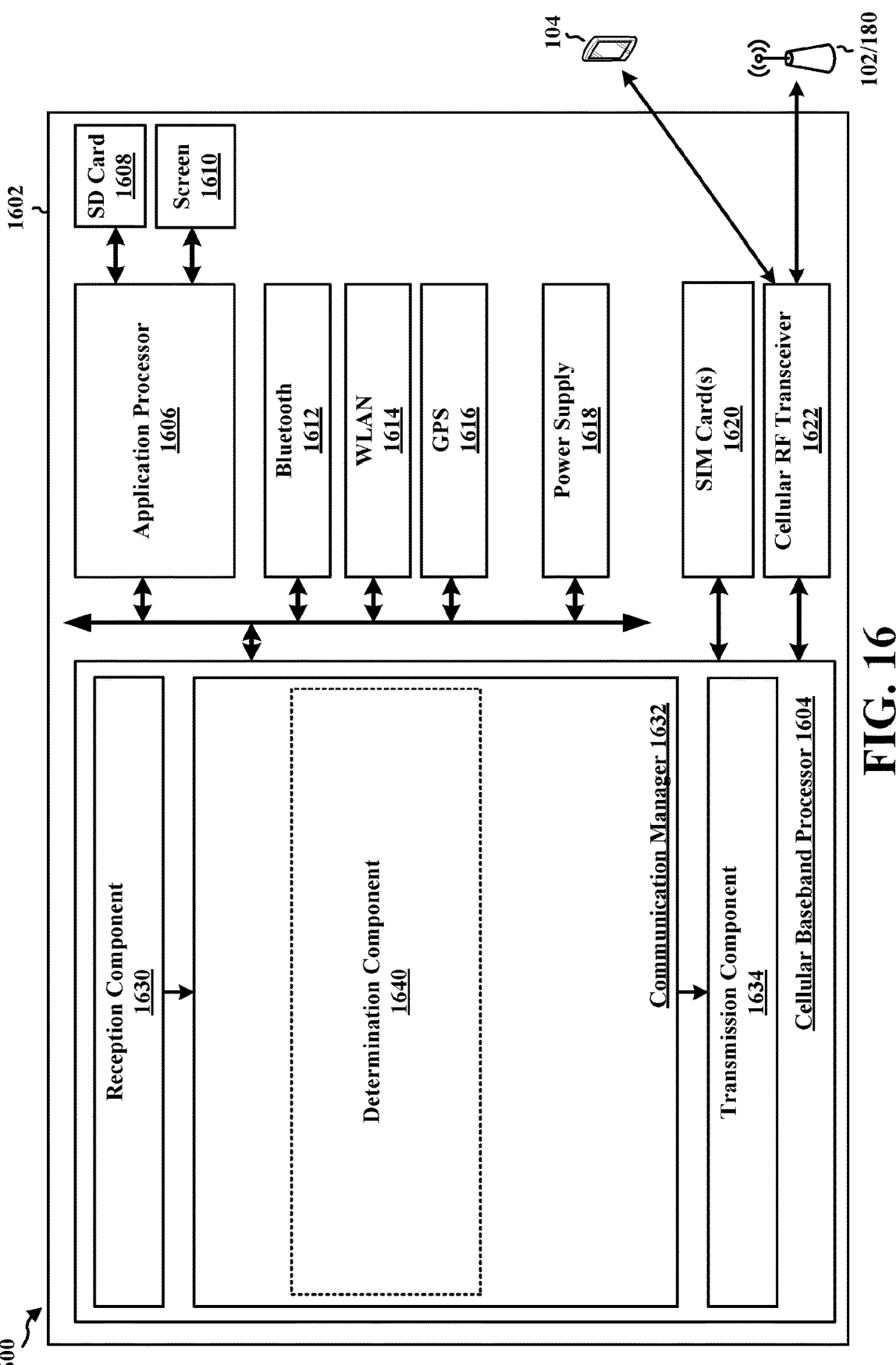
FIG. 16 is a diagram illustrating an example of a hardware implementation for an example apparatus.

Further, 1404 may be performed by determination component 1640 in FIG. 16. In some aspects, if the first wireless device is outside of a coverage of a base station, the configuration for inter-RAT or intra-RAT SL CA may be received from the second device.

In some aspects, if the first wireless device is within a coverage of a base station, the configuration for inter-RAT or intra-RAT SL CA may be received from the base station via radio resource control (RRC) signaling, where the configuration is a user equipment (UE)-specific configuration, as described in connection with the examples in FIGS. 4-13. If the first wireless device is within a coverage of a base station, the configuration for inter-RAT or intra-RAT SL CA may be received from the base station via system information (SI) or a system information block (SIB), where the configuration is a common configuration, as described in connection with the examples in FIGS. 4-13. If the first wireless device is outside of a coverage of a base station, the first wireless device may be preconfigured with the configuration for inter-RAT or intra-RAT SL CA, as described in connection with the examples in FIGS. 4-13. Also, the one or more inter-RAT or intra-RAT CA parameters may be associated with at least one of sidelink inter-RAT CA with coexistence or intra-RAT CA, one or more carriers or carrier combinations for inter-RAT CA with coexistence or intra-RAT CA, or one or more carriers or carrier combinations blocked for inter-RAT CA with coexistence or intra-RAT CA, as described in connection with the examples in FIGS. 4-13.

At 1406, the apparatus may transmit, to at least one second wireless device, a configuration for inter-RAT or intra-RAT SL CA, as described in connection with the examples in FIGS. 4-13. For example, as described in 1322 of FIG. 13, wireless device 1302 may transmit, to at least one second wireless device, a configuration for inter-RAT or intra-RAT SL CA. Further, 1406 may be performed by determination component 1640 in FIG. 16. The first wireless device may support communication via one or more RATs for inter-RAT or intra-RAT CA, the one or more RATs including at least one of new radio (NR) or long-term evolution (LTE), as described in connection with the examples in FIGS. 4-13. Also, the first wireless device may support communication via multiple RATs and the at least one second wireless device supports communication via at least one RAT, as described in connection with the examples in FIGS. 4-13.

At 1408, the apparatus may determine one or more inter-RAT or intra-RAT carriers for SL CA based on the configuration for inter-RAT or intra-RAT SL CA, as described in connection with the examples in FIGS. 4-13. For example, as described in 1330 of FIG. 13, wireless device 1302 may determine one or more inter-RAT or intra-RAT carriers for SL CA based on the configuration for inter-RAT or intra-RAT SL CA. Further, 1408 may be performed by determination component 1640 in FIG. 16.

At 1410, the apparatus may measure at least one of a channel busy ratio (CBR), a reference signal received power (RSRP), or a received signal strength indicator (RSSI) of each of the plurality of candidate inter-RAT or intra-RAT carriers, as described in connection with the examples in FIGS. 4-13. For example, as described in 1340 of FIG. 13, wireless device 1302 may measure at least one of a channel busy ratio (CBR), a reference signal received power (RSRP), or a received signal strength indicator (RSSI) of each of the plurality of candidate inter-RAT or intra-RAT carriers. Further, 1410 may be performed by determination component 1640 in FIG. 16.

At 1412, the apparatus may select the one or more inter-RAT or intra-RAT carriers from a plurality of candidate inter-RAT or intra-RAT carriers based on the configuration for inter-RAT or intra-RAT SL CA, as described in connection with the examples in FIGS. 4-13. For example, as described in 1350 of FIG. 13, wireless device 1302 may select the one or more inter-RAT or intra-RAT carriers from a plurality of candidate inter-RAT or intra-RAT carriers based on the configuration for inter-RAT or intra-RAT SL CA. Further, 1412 may be performed by determination component 1640 in FIG. 16. In some aspects, the one or more inter-RAT or intra-RAT carriers may be selected based on the measurement of at least one of the CBR, RSRP, or RSSI of each of the plurality of candidate inter-RAT or intra-RAT carriers, as described in connection with the examples in FIGS. 4-13.

At 1414, the apparatus may transmit, to at least one second wireless device, an indication of the one or more inter-RAT or intra-RAT carriers for SL CA, as described in connection with the examples in FIGS. 4-13. For example, as described in 1360 of FIG. 13, wireless device 1302 may transmit, to at least one second wireless device, an indication of the one or more inter-RAT or intra-RAT carriers for SL CA. Further, 1414 may be performed by determination component 1640 in FIG. 16. The indication of the one or more inter-RAT or intra-RAT carriers may be transmitted via radio resource control (RRC) signaling or a medium access control (MAC) control element (MAC-CE), as described in connection with the examples in FIGS. 4-13.

At 1416, the apparatus may receive, from the at least one second wireless device, a confirmation of the indication of the one or more inter-RAT or intra-RAT carriers, as described in connection with the examples in FIGS. 4-13. For example, as described in 1372 of FIG. 13, wireless device 1302 may receive, from the at least one second wireless device, a confirmation of the indication of the one or more inter-RAT or intra-RAT carriers. Further, 1416 may be performed by determination component 1640 in FIG. 16. The confirmation of the indication of the one or more inter-RAT or intra-RAT carriers may be received via radio resource control (RRC) signaling or an acknowledgement (ACK) to a medium access control (MAC) control element (MAC-CE), as described in connection with the examples in FIGS. 4-13.

At 1418, the apparatus may communicate with the at least one second wireless device via one or more sidelinks (SLs) based on the one or more inter-RAT or intra-RAT carriers for SL CA, as described in connection with the examples in FIGS. 4-13. For example, as described in 1380 of FIG. 13, wireless device 1302 may communicate with the at least one second wireless device via one or more sidelinks (SLs) based on the one or more inter-RAT or intra-RAT carriers for SL CA. Further, 1418 may be performed by determination component 1640 in FIG. 16. In some instances, one or more packets for a first RAT may be communicated via at least one of a first RAT carrier or a second RAT carrier, as described in connection with the examples in FIGS. 4-13.

At 1420, the apparatus may re-select or drop the one or more inter-RAT or intra-RAT carriers from the plurality of candidate inter-RAT or intra-RAT carriers; or select one or more other inter-RAT or intra-RAT carriers from the plurality of candidate inter-RAT or intra-RAT carriers, where the one or more other inter-RAT or intra-RAT carriers are selected if the one or more inter-RAT or intra-RAT carriers are dropped, as described in connection with the examples in FIGS. 4-13. For example, as described in 1390 of FIG. 13, wireless device 1302 may re-select or drop the one or more inter-RAT or intra-RAT carriers from the plurality of candidate inter-RAT or intra-RAT carriers; or select one or more other inter-RAT or intra-RAT carriers from the plurality of candidate inter-RAT or intra-RAT carriers, where the one or more other inter-RAT or intra-RAT carriers are selected if the one or more inter-RAT or intra-RAT carriers are dropped. Further, 1420 may be performed by determination component 1640 in FIG. 16. The apparatus may also measure at least one of a channel busy ratio (CBR), a reference signal received power (RSRP), or a received signal strength indicator (RSSI) of the plurality of candidate inter-RAT or intra-RAT carriers, where the one or more inter-RAT or intra-RAT carriers are re-selected or dropped based on the measurement and the one or more other inter-RAT or intra-RAT carriers are selected based on the measurement, as described in connection with the examples in FIGS. 4-13.

Figure 15:
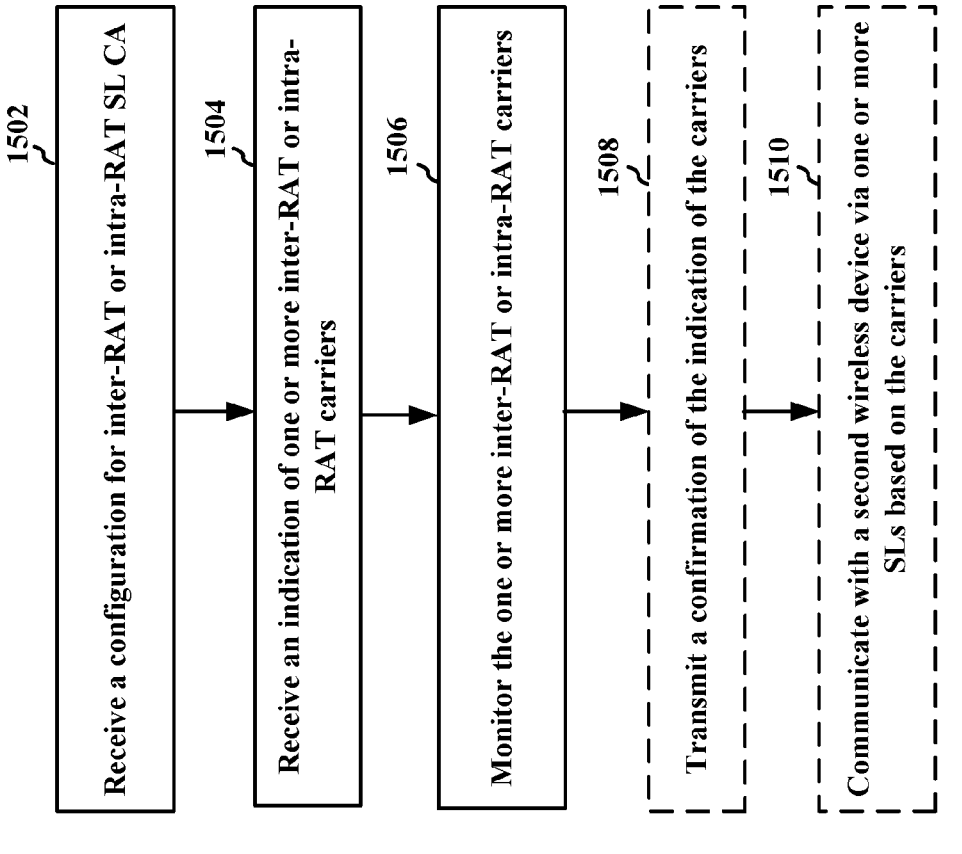
FIG. 15 is a flowchart of a method of wireless communication.

FIG. 15 is a flowchart 1500 of a method of wireless communication. The method may be performed by an apparatus, such as a UE or a component of a UE (e.g., the UE 104, 350, 704, 804, 904, 1004, and apparatus 1702). Optional aspects are illustrated with a dashed line. The methods described herein can provide a number of benefits, such as improving communication signaling, resource utilization, and/or power savings.

At 1502, the apparatus may receive a configuration for inter-radio access technology (inter-RAT) or intra-RAT sidelink (SL) carrier aggregation (CA) including one or more inter-RAT or intra-RAT CA parameters, as described in connection with the examples in FIGS. 4-13. For example, as described in 1326 of FIG. 13, wireless device 1304 may receive a configuration for inter-radio access technology (inter-RAT) or intra-RAT sidelink (SL) carrier aggregation (CA) including one or more inter-RAT or intra-RAT CA parameters. Further, 1502 may be performed by determination component 1740 in FIG. 17.

In some aspects, if the first wireless device is within a coverage of a base station, the configuration for inter-RAT or intra-RAT SL CA may be received from the base station via radio resource control (RRC) signaling, where the configuration is a user equipment (UE)-specific configuration, as described in connection with the examples in FIGS. 4-13. If the first wireless device is within a coverage of a base station, the configuration for inter-RAT or intra-RAT SL CA may be received from the base station via system information (SI) or a system information block (SIB), where the configuration is a common configuration, as described in connection with the examples in FIGS. 4-13. If the first wireless device is outside of a coverage of a base station, the first wireless device may be preconfigured with the configuration for inter-RAT or intra-RAT SL CA, as described in connection with the examples in FIGS. 4-13. Also, the one or more inter-RAT or intra-RAT CA parameters may be associated with at least one of sidelink inter-RAT CA with coexistence or intra-RAT CA, one or more carriers or carrier combinations for inter-RAT CA with coexistence or intra-RAT CA, or one or more carriers or carrier combinations blocked for inter-RAT CA with coexistence or intra-RAT CA, as described in connection with the examples in FIGS. 4-13.

At 1504, the apparatus may receive, from a second wireless device, an indication of one or more inter-RAT or intra-RAT carriers for SL CA, as described in connection with the examples in FIGS. 4-13. For example, as described in 1362 of FIG. 13, wireless device 1304 may receive, from a second wireless device, an indication of one or more inter-RAT or intra-RAT carriers for SL CA. Further, 1504 may be performed by determination component 1740 in FIG. 17. Also, apparatus or first wireless device may support communication via at least one RAT and the second wireless device may support communication via multiple RATs, as described in connection with the examples in FIGS. 4-13.

At 1506, the apparatus may monitor, based on the received indication, the one or more inter-RAT or intra-RAT carriers for SL CA, as described in connection with the examples in FIGS. 4-13. For example, as described in 1366 of FIG. 13, wireless device 1304 may monitor, based on the received indication, the one or more inter-RAT or intra-RAT carriers for SL CA. Further, 1506 may be performed by determination component 1740 in FIG. 17.

At 1508, the apparatus may transmit, to the second wireless device, a confirmation of the indication of the one or more inter-RAT or intra-RAT carriers, where the confirmation of the indication of the one or more inter-RAT or intra-RAT carriers is transmitted via radio resource control (RRC) signaling or an acknowledgement (ACK) to a medium access control (MAC) control element (MAC-CE), as described in connection with the examples in FIGS. 4-13. For example, as described in 1370 of FIG. 13, wireless device 1304 may transmit, to the second wireless device, a confirmation of the indication of the one or more inter-RAT or intra-RAT carriers, where the confirmation of the indication of the one or more inter-RAT or intra-RAT carriers is transmitted via radio resource control (RRC) signaling or an acknowledgement (ACK) to a medium access control (MAC) control element (MAC-CE). Further, 1508 may be performed by determination component 1740 in FIG. 17.

At 1510, the apparatus may communicate with the second wireless device via one or more sidelinks (SLs) based on the one or more inter-RAT or intra-RAT carriers for SL CA, as described in connection with the examples in FIGS. 4-13. For example, as described in 1382 of FIG. 13, wireless device 1304 may communicate with the second wireless device via one or more sidelinks (SLs) based on the one or more inter-RAT or intra-RAT carriers for SL CA. Further, 1510 may be performed by determination component 1740 in FIG. 17. For instance, one or more packets for a first RAT may be communicated via at least one of a first RAT carrier or a second RAT carrier, as described in connection with the examples in FIGS. 4-13.

FIG. 16 is a diagram 1600 illustrating an example of a hardware implementation for an apparatus 1602. The apparatus 1602 is a UE and includes a cellular baseband processor 1604 (also referred to as a modem) coupled to a cellular RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/ memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the aforediscussed additional modules of the apparatus 1602.

The communication manager 1632 includes a determination component 1640 that may be configured to transmit, to a base station, at least one of an indication of a capability of a first wireless device or a suitable configuration for inter-radio access technology (inter-RAT) or intra-RAT sidelink (SL) carrier aggregation (CA), e.g., as described in connection with 1402 in FIG. 14. Determination component 1640 may also be configured to receive a configuration for inter-radio access technology (inter-RAT) or intra-RAT sidelink (SL) carrier aggregation (CA) including one or more inter-RAT or intra-RAT CA parameters, e.g., as described in connection with 1404 in FIG. 14. Determination component 1640 may also be configured to transmit, to at least one second wireless device, a configuration for inter-RAT or intra-RAT SL CA, e.g., as described in connection with 1406 in FIG. 14. Determination component 1640 may also be configured to determine one or more inter-RAT or intra-RAT carriers for SL CA based on the configuration for inter-RAT or intra-RAT SL CA, e.g., as described in connection with 1408 in FIG. 14. Determination component 1640 may also be configured to measure at least one of a channel busy ratio (CBR), a reference signal received power (RSRP), or a received signal strength indicator (RSSI) of each of the plurality of candidate inter-RAT or intra-RAT carriers, e.g., as described in connection with 1410 in FIG. 14. Determination component 1640 may also be configured to select the one or more inter-RAT or intra-RAT carriers from a plurality of candidate inter-RAT or intra-RAT carriers based on the configuration for inter-RAT or intra-RAT SL CA, e.g., as described in connection with 1412 in FIG. 14. Determination component 1640 may also be configured to transmit, to at least one second wireless device, an indication of the one or more inter-RAT or intra-RAT carriers for SL CA, e.g., as described in connection with 1414 in FIG. 14. Determination component 1640 may also be configured to receive, from the at least one second wireless device, a confirmation of the indication of the one or more inter-RAT or intra-RAT carriers, e.g., as described in connection with 1416 in FIG. 14. Determination component 1640 may also be configured to communicate with the at least one second wireless device via one or more sidelinks (SLs) based on the one or more inter-RAT or intra-RAT carriers for SL CA, e.g., as described in connection with 1418 in FIG. 14. Determination component 1640 may also be configured to re-select or drop the one or more inter-RAT or intra-RAT carriers from the plurality of candidate inter-RAT or intra-RAT carriers; or select one or more other inter-RAT or intra-RAT carriers from the plurality of candidate inter-RAT or intra-RAT carriers, where the one or more other inter-RAT or intra-RAT carriers are selected if the one or more inter-RAT or intra-RAT carriers are dropped, e.g., as described in connection with 1420 in FIG. 14.

The apparatus may include additional components that perform each of the blocks of the algorithm in the aforementioned flowcharts of FIGS. 13 and 14. As such, each block in the aforementioned flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for transmitting, to a base station, at least one of an indication of a capability of a first wireless device or a suitable configuration for inter-radio access technology (inter-RAT) or intra-RAT sidelink (SL) carrier aggregation (CA); means for receiving a configuration for inter-radio access technology (inter-RAT) or intra-RAT sidelink (SL) carrier aggregation (CA) including one or more inter-RAT or intra-RAT CA parameters; means for transmitting, to at least one second wireless device, a configuration for inter-RAT or intra-RAT SL CA; means for determining one or more inter-RAT or intra-RAT carriers for SL CA based on the configuration for inter-RAT or intra-RAT SL CA; means for measuring at least one of a channel busy ratio (CBR), a reference signal received power (RSRP), or a received signal strength indicator (RSSI) of each of the plurality of candidate inter-RAT or intra-RAT carriers; means for selecting the one or more inter-RAT or intra-RAT carriers from a plurality of candidate inter-RAT or intra-RAT carriers based on the configuration for inter-RAT or intra-RAT SL CA; means for transmitting, to at least one second wireless device, an indication of the one or more inter-RAT or intra-RAT carriers for SL CA; means for receiving, from the at least one second wireless device, a confirmation of the indication of the one or more inter-RAT or intra-RAT carriers; means for communicating with the at least one second wireless device via one or more sidelinks (SLs) based on the one or more inter-RAT or intra-RAT carriers for SL CA; means for re-selecting or dropping the one or more inter-RAT or intra-RAT carriers from the plurality of candidate inter-RAT or intra-RAT carriers; means for selecting one or more other inter-RAT or intra-RAT carriers from the plurality of candidate inter-RAT or intra-RAT carriers, where the one or more other inter-RAT or intra-RAT carriers are selected if the one or more inter-RAT or intra-RAT carriers are dropped; and means for measuring at least one of a channel busy ratio (CBR), a reference signal received power (RSRP), or a received signal strength indicator (RSSI) of the plurality of candidate inter-RAT or intra-RAT carriers, where the one or more inter-RAT or intra-RAT carriers are re-selected or dropped based on the measurement and the one or more other inter-RAT or intra-RAT carriers are selected based on the measurement. The aforementioned means may be one or more of the aforementioned components of the apparatus 1602 configured to perform the functions recited by the aforementioned means. As described supra, the apparatus 1602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
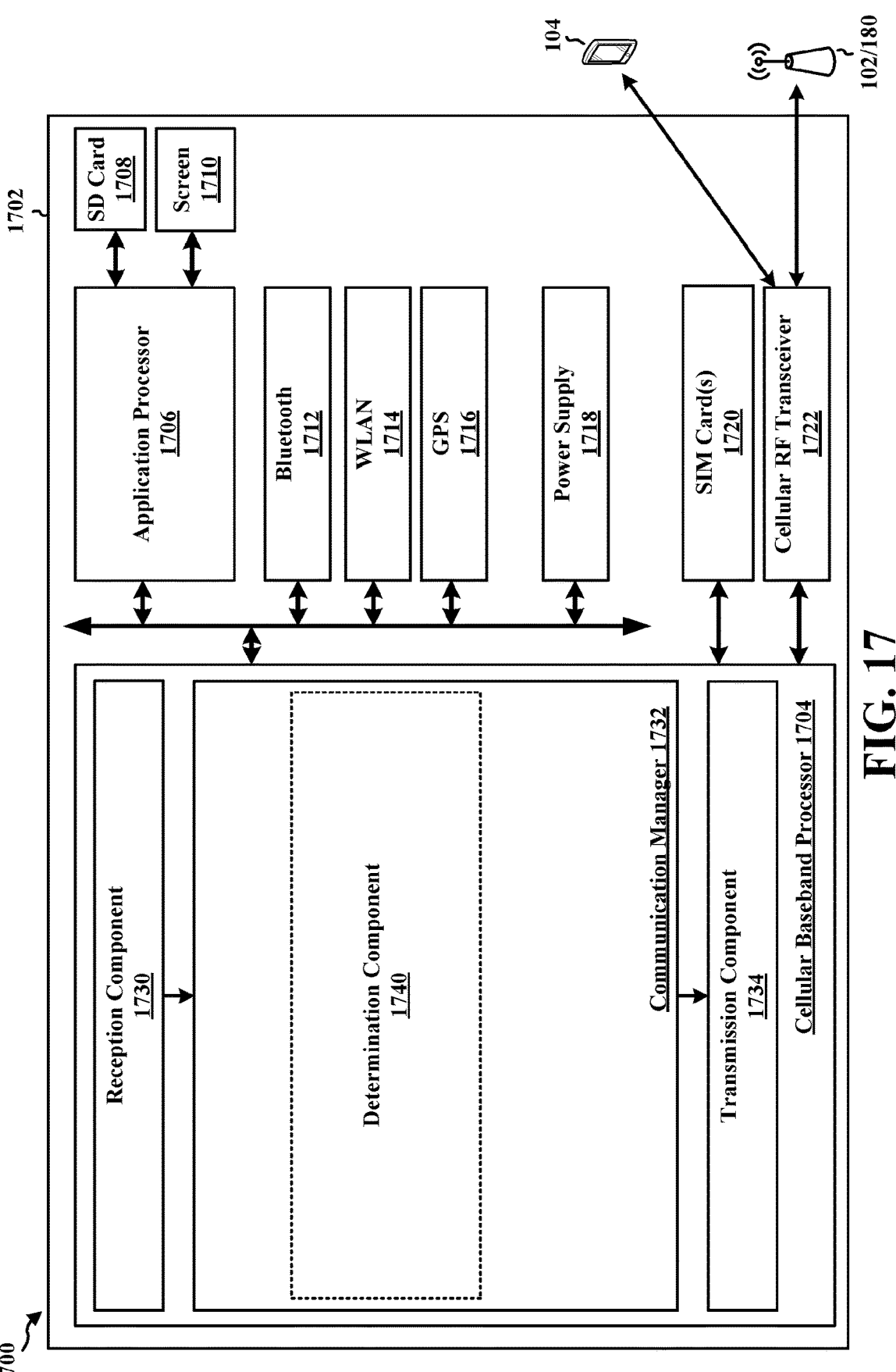
FIG. 17 is a diagram illustrating an example of a hardware implementation for an example apparatus.

FIG. 17 is a diagram 1700 illustrating an example of a hardware implementation for an apparatus 1702. The apparatus 1702 is a UE and includes a cellular baseband processor 1704 (also referred to as a modem) coupled to a cellular RF transceiver 1722 and one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and a power supply 1718. The cellular baseband processor 1704 communicates through the cellular RF transceiver 1722 with the UE 104 and/or BS 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the aforediscussed additional modules of the apparatus 1702.

The communication manager 1732 includes a determination component 1740 that may be configured to receive a configuration for inter-radio access technology (inter-RAT) or intra-RAT sidelink (SL) carrier aggregation (CA) including one or more inter-RAT or intra-RAT CA parameters, e.g., as described in connection with 1502 in FIG. 15. Determination component 1740 may also be configured to receive, from a second wireless device, an indication of one or more inter-RAT or intra-RAT carriers for SL CA, e.g., as described in connection with 1504 in FIG. 15. Determination component 1740 may also be configured to monitor, based on the received indication, the one or more inter-RAT or intra-RAT carriers for SL CA, e.g., as described in connection with 1506 in FIG. 15. Determination component 1740 may also be configured to transmit, to the second wireless device, a confirmation of the indication of the one or more inter-RAT or intra-RAT carriers, where the confirmation of the indication of the one or more inter-RAT or intra-RAT carriers is transmitted via radio resource control (RRC) signaling or an acknowledgement (ACK) to a medium access control (MAC) control element (MAC-CE), e.g., as described in connection with 1508 in FIG. 15. Determination component 1740 may also be configured to communicate with the second wireless device via one or more sidelinks (SLs)

based on the one or more inter-RAT or intra-RAT carriers for SL CA, e.g., as described in connection with 1510 in FIG. 15.

The apparatus may include additional components that perform each of the blocks of the algorithm in the aforementioned flowcharts of FIGS. 13 and 15. As such, each block in the aforementioned flowcharts of FIGS. 13 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the cellular baseband processor 1704, includes means for receiving a configuration for inter-radio access technology (inter-RAT) or intra-RAT sidelink (SL) carrier aggregation (CA) including one or more inter-RAT or intra-RAT CA parameters; means for receiving, from a second wireless device, an indication of one or more inter-RAT or intra-RAT carriers for SL CA; means for monitoring, based on the received indication, the one or more inter-RAT or intra-RAT carriers for SL CA; means for transmitting, to the second wireless device, a confirmation of the indication of the one or more inter-RAT or intra-RAT carriers, where the confirmation of the indication of the one or more inter-RAT or intra-RAT carriers is transmitted via radio resource control (RRC) signaling or an acknowledgement (ACK) to a medium access control (MAC) control element (MAC-CE); and means for communicating with the second wireless device via one or more sidelinks (SLs) based on the one or more inter-RAT or intra-RAT carriers for SL CA. The aforementioned means may be one or more of the aforementioned components of the apparatus 1702 configured to perform the functions recited by the aforementioned means. As described supra, the apparatus 1702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a wireless device or user equipment (UE). The method includes receiving a configuration for inter-radio access technology (inter-RAT) or intra-RAT sidelink (SL) carrier aggregation (CA) including one or more inter-RAT or intra-RAT CA parameters; determining one or more inter-RAT or intra-RAT carriers for SL CA based on the configuration for inter-RAT or intra-RAT SL CA; and transmitting, to at least one second wireless device, an indication of the one or more inter-RAT or intra-RAT carriers determined for SL CA.

Aspect 2 is the method of aspect 1, further including selecting the one or more inter-RAT or intra-RAT carriers from a plurality of candidate inter-RAT or intra-RAT carriers based on the configuration for inter-RAT or intra-RAT SL CA.

Aspect 3 is the method of any of aspects 1 and 2, further including measuring at least one of a channel busy ratio (CBR), a reference signal received power (RSRP), or a received signal strength indicator (RSSI) of each of the plurality of candidate inter-RAT or intra-RAT carriers.

Aspect 4 is the method of any of aspects 1 to 3, where the one or more inter-RAT or intra-RAT carriers are selected based on the measurement of at least one of the CBR, RSRP, or RSSI of each of the plurality of candidate inter-RAT or intra-RAT carriers.

Aspect 5 is the method of any of aspects 1 to 4, further including re-selecting or dropping the one or more inter-RAT or intra-RAT carriers from the plurality of candidate inter-RAT or intra-RAT carriers; or selecting one or more other inter-RAT or intra-RAT carriers from the plurality of candidate inter-RAT or intra-RAT carriers, where the one or more other inter-RAT or intra-RAT carriers are selected if the one or more inter-RAT or intra-RAT carriers are dropped.

Aspect 6 is the method of any of aspects 1 to 5, further including measuring at least one of a channel busy ratio (CBR), a reference signal received power (RSRP), or a received signal strength indicator (RSSI) of the plurality of candidate inter-RAT or intra-RAT carriers, where the one or more inter-RAT or intra-RAT carriers are re-selected or dropped based on the measurement and the one or more other inter-RAT or intra-RAT carriers are selected based on the measurement.

Aspect 7 is the method of any of aspects 1 to 6, further including communicating with the at least one second wireless device via one or more sidelinks (SLs) based on the one or more inter-RAT or intra-RAT carriers selected for SL CA.

Aspect 8 is the method of any of aspects 1 to 7, where one or more packets for a first RAT are communicated via at least one of a first RAT carrier or a second RAT carrier.

Aspect 9 is the method of any of aspects 1 to 8, where, if the first wireless device is within a coverage of a base station, the configuration for inter-RAT or intra-RAT SL CA is received from the base station via radio resource control (RRC) signaling, where the configuration is a user equipment (UE)-specific configuration.

Aspect 10 is the method of any of aspects 1 to 9, where, if the first wireless device is within a coverage of a base station, the configuration for inter-RAT or intra-RAT SL CA is received from the base station via system information (SI) or a system information block (SIB), where the configuration is a common configuration.

Aspect 11 is the method of any of aspects 1 to 10, where, if the first wireless device is outside of a coverage of a base station, the first wireless device is preconfigured with the configuration for inter-RAT or intra-RAT SL CA.

Aspect 12 is the method of any of aspects 1 to 11, where the one or more inter-RAT or intra-RAT CA parameters are associated with at least one of sidelink inter-RAT CA with coexistence or intra-RAT CA, one or more carriers or carrier combinations for inter-RAT CA with coexistence or intra-RAT CA, or one or more carriers or carrier combinations blocked for inter-RAT CA with coexistence or intra-RAT CA.

Aspect 13 is the method of any of aspects 1 to 12, further including transmitting, to the at least one second wireless device, the configuration for inter-RAT or intra-RAT SL CA.

Aspect 14 is the method of any of aspects 1 to 13, further including receiving, from the at least one second wireless device, a confirmation of the indication of the one or more inter-RAT or intra-RAT carriers.

Aspect 15 is the method of any of aspects 1 to 14, where the confirmation of the indication of the one or more inter-RAT or intra-RAT carriers is received via radio resource control (RRC) signaling or an acknowledgement (ACK) to a medium access control (MAC) control element (MAC-CE).

Aspect 16 is the method of any of aspects 1 to 15, further including transmitting, to a base station, at least one of an indication of a capability of the first wireless device or a suitable configuration for inter-RAT or intra-RAT SL CA.

Aspect 17 is the method of any of aspects 1 to 16, where the first wireless device supports communication via one or more RATs for inter-RAT or intra-RAT CA, the one or more RATs including at least one of new radio (NR) or long-term evolution (LTE).

Aspect 18 is the method of any of aspects 1 to 17, where the first wireless device supports communication via multiple RATs and the at least one second wireless device supports communication via at least one RAT.

Aspect 19 is the method of any of aspects 1 to 18, where the indication of the one or more inter-RAT or intra-RAT carriers is transmitted via radio resource control (RRC) signaling or a medium access control (MAC) control element (MAC-CE).

Aspect 20 is an apparatus for wireless communication including at least one processor coupled to a memory and configured to implement a method as in any of aspects 1 to 19.

Aspect 21 is an apparatus for wireless communication including means for implementing a method as in any of aspects 1 to 19.

Aspect 22 is a computer-readable medium storing computer executable code, where the code when executed by a processor causes the processor to implement a method as in any of aspects 1 to 19.

Aspect 23 is a method of wireless communication of a wireless device or user equipment (UE). The method includes receiving a configuration for inter-radio access technology (inter-RAT) or intra-RAT sidelink (SL) carrier aggregation (CA) including one or more inter-RAT or intra-RAT CA parameters; receiving, from a second wireless device, an indication of one or more inter-RAT or intra-RAT carriers for SL CA; and monitoring, based on the received indication, the one or more inter-RAT or intra-RAT carriers for SL CA.

Aspect 24 is the method of aspect 23, further including communicating with the second wireless device via one or more sidelinks (SLs) based on the one or more inter-RAT or intra-RAT carriers for SL CA.

Aspect 25 is the method of any of aspects 23 to 24, where one or more packets for a first RAT are communicated via at least one of a first RAT carrier or a second RAT carrier.

Aspect 26 is the method of any of aspects 23 to 25, where, if the first wireless device is within a coverage of a base station, the configuration for inter-RAT or intra-RAT SL CA is received from the base station via radio resource control (RRC) signaling, where the configuration is a user equipment (UE)-specific configuration.

Aspect 27 is the method of any of aspects 23 to 26, where, if the first wireless device is within a coverage of a base station, the configuration for inter-RAT or intra-RAT SL CA is received from the base station via system information (SI) or a system information block (SIB), where the configuration is a common configuration.

Aspect 28 is the method of any of aspects 23 to 27, where, if the first wireless device is outside of a coverage of a base station, the first wireless device is preconfigured with the configuration for inter-RAT or intra-RAT SL CA.

Aspect 29 is the method of any of aspects 23 to 28, where the one or more inter-RAT or intra-RAT CA parameters are associated with at least one of sidelink inter-RAT CA with coexistence or intra-RAT CA, one or more carriers or carrier combinations for inter-RAT CA with coexistence or intra-RAT CA, or one or more carriers or carrier combinations blocked for inter-RAT CA with coexistence or intra-RAT CA.

Aspect 30 is the method of any of aspects 23 to 29, further including transmitting, to the second wireless device, a confirmation of the indication of the one or more inter-RAT or intra-RAT carriers, where the confirmation of the indication of the one or more inter-RAT or intra-RAT carriers is transmitted via radio resource control (RRC) signaling or an acknowledgement (ACK) to a medium access control (MAC) control element (MAC-CE).

Aspect 31 is the method of any of aspects 23 to 30, where the first wireless device supports communication via at least one RAT and the second wireless device supports communication via multiple RATs.

Aspect 32 is the method of any of aspects 23 to 31, where, if the first wireless device is outside of a coverage of a base station, the configuration for inter-RAT or intra-RAT SL CA is received from the second device.

Aspect 33 is an apparatus for wireless communication including at least one processor coupled to a memory and configured to implement a method as in any of aspects 23 to 32.

Aspect 34 is an apparatus for wireless communication including means for implementing a method as in any of aspects 23 to 32.

Aspect 35 is a computer-readable medium storing computer executable code, where the code when executed by a processor causes the processor to implement a method as in any of aspects 23 to 32.

What is claimed is:

1. A method of wireless communication of a first wireless device, comprising:
 receiving a configuration for inter-radio access technology (inter-RAT) or intra-RAT sidelink (SL) carrier aggregation (CA) including one or more inter-RAT or intra-RAT CA parameters;
 determining one or more inter-RAT or intra-RAT carriers for SL CA based on the configuration for inter-RAT or intra-RAT SL CA; and
 transmitting, to at least one second wireless device, an indication of the one or more inter-RAT or intra-RAT carriers determined for SL CA, wherein the first wireless device includes a first user equipment (UE) and the at least one second wireless device includes at least one second UE.

2. The method of claim 1, further comprising:
 selecting the one or more inter-RAT or intra-RAT carriers from a plurality of candidate inter-RAT or intra-RAT carriers based on the configuration for inter-RAT or intra-RAT SL CA.

3. The method of claim 2, further comprising:
 measuring at least one of a channel busy ratio (CBR), a reference signal received power (RSRP), or a received signal strength indicator (RSSI) of each of the plurality of candidate inter-RAT or intra-RAT carriers.

4. The method of claim 3, wherein the one or more inter-RAT or intra-RAT carriers are selected based on the measurement of at least one of the CBR, RSRP, or RSSI of each of the plurality of candidate inter-RAT or intra-RAT carriers.

5. The method of claim 2, further comprising:
 re-selecting or dropping the one or more inter-RAT or intra-RAT carriers from the plurality of candidate inter-RAT or intra-RAT carriers; or
 selecting one or more other inter-RAT or intra-RAT carriers from the plurality of candidate inter-RAT or intra-RAT carriers, wherein the one or more other inter-RAT or intra-RAT carriers are selected if the one or more inter-RAT or intra-RAT carriers are dropped.

6. The method of claim 5, further comprising:
 measuring at least one of a channel busy ratio (CBR), a reference signal received power (RSRP), or a received signal strength indicator (RSSI) of the plurality of candidate inter-RAT or intra-RAT carriers, wherein the one or more inter-RAT or intra-RAT carriers are re-selected or dropped based on the measurement and the one or more other inter-RAT or intra-RAT carriers are selected based on the measurement.

7. The method of claim 2, further comprising:
communicating with the at least one second wireless device via one or more sidelinks (SLs) based on the one or more inter-RAT or intra-RAT carriers selected for SL CA.

8. The method of claim 7, wherein one or more packets for a first RAT are communicated via at least one of a first RAT carrier or a second RAT carrier.

9. The method of claim 1, wherein, if the first wireless device is within a coverage of a base station, the configuration for inter-RAT or intra-RAT SL CA is received from the base station via radio resource control (RRC) signaling, wherein the configuration is a user equipment (UE)-specific configuration.

10. The method of claim 1, wherein, if the first wireless device is within a coverage of a base station, the configuration for inter-RAT or intra-RAT SL CA is received from the base station via system information (SI) or a system information block (SIB), wherein the configuration is a common configuration.

11. The method of claim 1, wherein, if the first wireless device is outside of a coverage of a base station, the first wireless device is preconfigured with the configuration for inter-RAT or intra-RAT SL CA.

12. The method of claim 1, wherein the one or more inter-RAT or intra-RAT CA parameters are associated with at least one of sidelink inter-RAT CA with coexistence or intra-RAT CA, one or more carriers or carrier combinations for inter-RAT CA with coexistence or intra-RAT CA, or one or more carriers or carrier combinations blocked for inter-RAT CA with coexistence or intra-RAT CA.

13. The method of claim 1, further comprising:
transmitting, to the at least one second wireless device, the configuration for inter-RAT or intra-RAT SL CA.

14. The method of claim 1, wherein the indication of the one or more inter-RAT or intra-RAT carriers is transmitted via radio resource control (RRC) signaling or a medium access control (MAC) control element (MAC-CE).

15. The method of claim 1, further comprising:
receiving, from the at least one second wireless device, a confirmation of the indication of the one or more inter-RAT or intra-RAT carriers.

16. The method of claim 15, wherein the confirmation of the indication of the one or more inter-RAT or intra-RAT carriers is received via radio resource control (RRC) signaling or an acknowledgement (ACK) to a medium access control (MAC) control element (MAC-CE).

17. The method of claim 1, further comprising:
transmitting, to a base station, at least one of an indication of a capability of the first wireless device or a suitable configuration for inter-RAT or intra-RAT SL CA.

18. The method of claim 1, wherein the first wireless device supports communication via one or more RATs for inter-RAT or intra-RAT CA, the one or more RATs including at least one of new radio (NR) or long-term evolution (LTE).

19. The method of claim 1, wherein the first wireless device supports communication via multiple RATs and the at least one second wireless device supports communication via at least one RAT.

20. An apparatus for wireless communication, the apparatus being a first wireless device, comprising:
memory; and
at least one processor coupled to the memory and configured to cause the apparatus to:
receive a configuration for inter-radio access technology (inter-RAT) or intra-RAT sidelink (SL) carrier aggregation (CA) including one or more inter-RAT or intra-RAT CA parameters;
determine one or more inter-RAT or intra-RAT carriers for SL CA based on the configuration for inter-RAT or intra-RAT SL CA; and
transmit, to at least one second wireless device, an indication of the one or more inter-RAT or intra-RAT carriers for SL CA, wherein the first wireless device includes a first user equipment (UE) and the at least one second wireless device includes at least one second UE.

21. A method of wireless communication of a first wireless device, comprising:
receiving a configuration for inter-radio access technology (inter-RAT) or intra-RAT sidelink (SL) carrier aggregation (CA) including one or more inter-RAT or intra-RAT CA parameters;
receiving, from a second wireless device, an indication of one or more inter-RAT or intra-RAT carriers for SL CA, wherein the first wireless device includes a first user equipment (UE) and the second wireless device includes a second UE; and
monitoring, based on the received indication, the one or more inter-RAT or intra-RAT carriers for SL CA.

22. The method of claim 21, further comprising:
communicating with the second wireless device via one or more sidelinks (SLs) based on the one or more inter-RAT or intra-RAT carriers for SL CA.

23. The method of claim 22, wherein one or more packets for a first RAT are communicated via at least one of a first RAT carrier or a second RAT carrier.

24. The method of claim 21, wherein, if the first wireless device is within a coverage of a base station, the configuration for inter-RAT or intra-RAT SL CA is received from the base station via radio resource control (RRC) signaling, wherein the configuration is a user equipment (UE)-specific configuration.

25. The method of claim 21, wherein, if the first wireless device is within a coverage of a base station, the configuration for inter-RAT or intra-RAT SL CA is received from the base station via system information (SI) or a system information block (SIB), wherein the configuration is a common configuration.

26. The method of claim 21, wherein, if the first wireless device is outside of a coverage of a base station, the first wireless device is preconfigured with the configuration for inter-RAT or intra-RAT SL CA.

27. The method of claim 21, wherein, if the first wireless device is outside of a coverage of a base station, the configuration for inter-RAT or intra-RAT SL CA is received from the second device.

28. The method of claim 21, wherein the one or more inter-RAT or intra-RAT CA parameters are associated with at least one of sidelink inter-RAT CA with coexistence or intra-RAT CA, one or more carriers or carrier combinations for inter-RAT CA with coexistence or intra-RAT CA, or one or more carriers or carrier combinations blocked for inter-RAT CA with coexistence or intra-RAT CA.

29. The method of claim 21, further comprising:
transmitting, to the second wireless device, a confirmation of the indication of the one or more inter-RAT or intra-RAT carriers, wherein the confirmation of the indication of the one or more inter-RAT or intra-RAT carriers is transmitted via radio resource control (RRC)

signaling or an acknowledgement (ACK) to a medium access control (MAC) control element (MAC-CE).

30. An apparatus for wireless communication, the apparatus being a first wireless device, comprising:

memory; and at least one processor coupled to the memory and configured to cause the apparatus to:

receive a configuration for inter-radio access technology (inter-RAT) or intra-RAT sidelink (SL) carrier aggregation (CA) including one or more inter-RAT or intra-RAT CA parameters;

receive, from a second wireless device, an indication of one or more inter-RAT or intra-RAT carriers for SL CA, wherein the first wireless device includes a first user equipment (UE) and the second wireless device includes a second UE; and monitor, based on the received indication, the one or more inter-RAT or intra-RAT carriers for SL CA.

\* \* \* \* \*